United States Patent [19]

Daniel

[11] Patent Number: 4,576,436
[45] Date of Patent: Mar. 18, 1986

[54] LIGHT DISTRIBUTION AND COLLECTION ASSEMBLIES AND METHODS

[76] Inventor: Maurice Daniel, 550 Jaycox Rd., Avon Lake, Ohio 44012

[21] Appl. No.: 462,676

[22] Filed: Jan. 31, 1983

[51] Int. Cl.⁴ .............................................. G02B 5/172
[52] U.S. Cl. ............................... 350/96.10; 350/96.15; 350/173
[58] Field of Search ............... 350/96.10, 96.15, 96.18, 350/96.19, 96.20, 169, 170, 171, 172, 173

[56] References Cited

U.S. PATENT DOCUMENTS

| | | | |
|---|---|---|---|
| 1,320,625 | 11/1919 | Kunz | 350/173 |
| 2,279,288 | 4/1942 | Orbeck | 350/173 X |
| 4,109,997 | 8/1978 | Iverson | 350/96.15 X |
| 4,398,791 | 8/1983 | Dorsey | 350/96.20 X |
| 4,401,360 | 8/1983 | Streckmann et al. | 350/96.20 X |
| 4,460,242 | 7/1984 | Birch et al. | 350/96.22 X |

*Primary Examiner*—William L. Sikes
*Assistant Examiner*—Akm E. Ullah
*Attorney, Agent, or Firm*—Sixbey, Friedman & Leedom

[57] ABSTRACT

A method and apparatus for uniformly distributing a substantially parallel beam of light along a light conducting distribution rod of fixed length is demonstrated using a series of imbedded beam splitting mirrors. The light distribution rod may have a wide variety of light distribution properties and may be bent into circular configurations. Also a method and light collection assembly is disclosed which use a series of mirrors to collect parallel or diverging light and redirect it into a narrow beam of parallel light. The collection is accomplished by spiral or asymptotic mirror surfaces which funnel the light by means of converging multiple reflections into a designated output pattern. A multiple channel optical fiber rotatable connector is a principle example of a device which employs both the light distributing and light collecting assemblies. This connector passes light between two relatively rotating sections.

21 Claims, 28 Drawing Figures

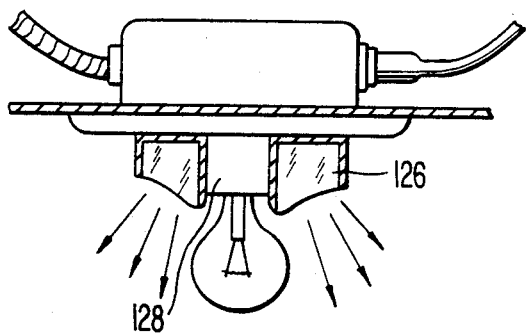
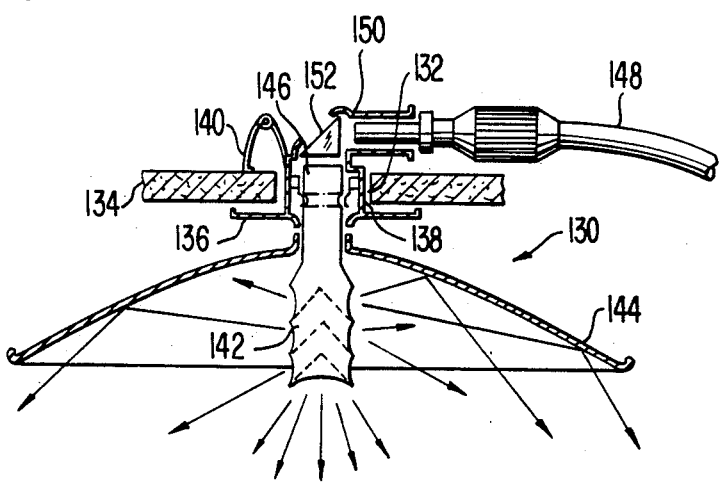
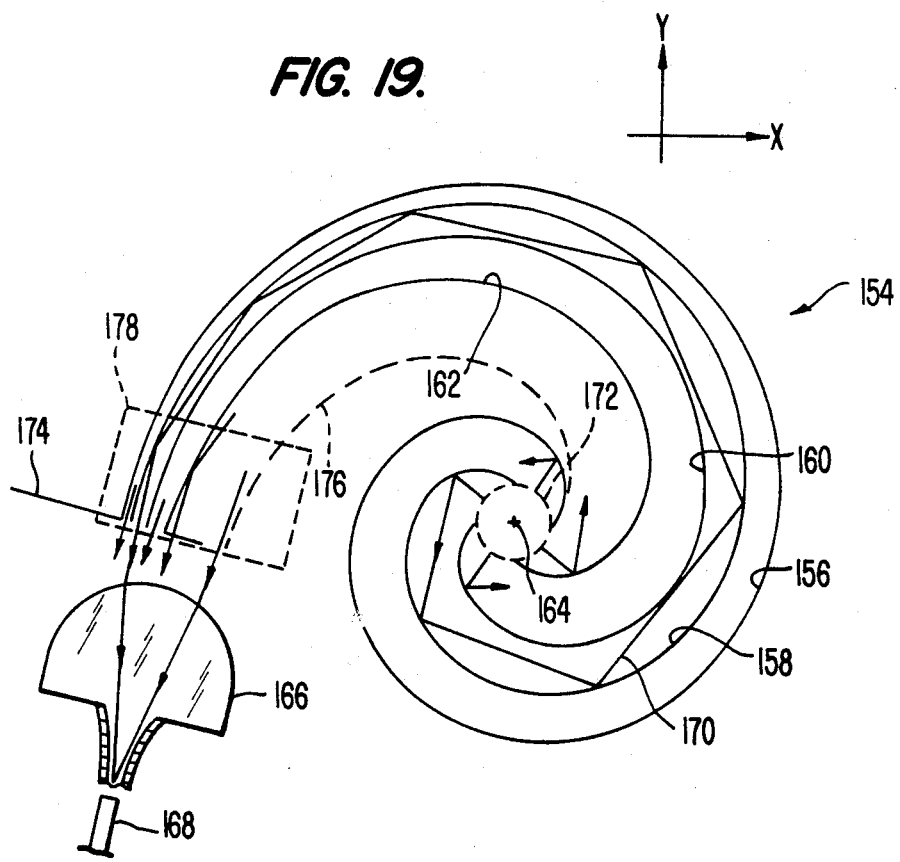

LIGHT DISTRIBUTION AND COLLECTION ASSEMBLIES AND METHODS

DESCRIPTION

1. Technical Field

This invention relates generally to devices for collecting and redirecting light as well as devices for distributing uniformly parallel beams of light and more particularly to the use of novel mirror assemblies in such light collection and distribution units.

2. Background Art

In the past, optical assemblies have been developed for distributing light and also for collecting light into a relatively narrow beam. However, these conventional assemblies generally include a combination of optical lenses and mirrors which require relatively large amounts of space. Attempts to develop compact optical units to perform light distribution or collection have resulted in units which either experience inordinate light losses or which provide non-uniform outputs.

A particular problem has existed when light is to be transmitted through a movable connector, as complex multiplexing units have been required to accomplish light transmission between relatively moving elements.

DISCLOSURE OF THE INVENTION

It is a primary aspect of the present invention to provide a novel and improved light distribution assembly which includes a light transmitting rod of uniform cross-section made of materials transparent to the wavelengths of electromagnetic radiation. Substantially parallel light may be input through one end of the rod at an angle parallel to the longitudinal axis thereof, and beam splitting mirror units are imbedded in the rod along said longitudinal axis so as to intersect said light beam. All of the beam splitting mirrors have an identical angular orientation relative to said longitudinal axis and are equally spaced from one another with the spacing being adjusted so that the secondary reflected light beams just overlap.

Another aspect of the present invention is to provide a novel and improved light distribution assembly which includes a light transmitting rod having a plurality of beam splitting mirrors imbedded therein and angularly oriented relative to the longitudinal axis of the light transmitting rod. The reflectivities of said beam splitting mirrors are adjusted so that each mirror reflects a secondary or output light beam having an intensity which is substantially equal to the intensity of the secondary light beam reflected by the remaining beam splitting mirrors.

A further aspect of the present invention is to provide a novel and improved light distribution assembly which includes a light transmitting rod of substantially rectangular cross-section having a plurality of beam splitting mirrors imbedded therein. The length of siad light transmitting rod is an integer multiple of the width, with the length being determined by the number of mirrors M imbedded in the rod in accordance with the formula length = width xM. The beam splitting mirrors are equally spaced and are at a 45° angle to the longitudinal axis of the light transmitting rod.

Still another aspect of the present invention is to provide a novel and improved light distribution assembly formed from a right triangular prism positioned at either end of the assembly and a plurality of parallelogram prisms of equal size secured together between the right triangular prisms. Beam splitting mirrors are formed on the hypotenuse faces of the right triangular prisms and on the inclined parallel faces of each parallelogram prism.

A further feature of the present invention is to provide a hybrid lighting fixture which includes at least one electric light source in combination with at least one optical light distribution unit which is provided with light from an optical light conducting cable.

Another aspect of the present invention is to provide a novel lighting fixture which incorporates an optical light distribution assembly supplied with light by an optical light conducting cable.

An important aspect of the present invention is to provide a novel and improved light collection assembly which incorporates a plurality of mirror units arranged to provide non-overlapping spiral light paths which extend from a central hub. Light originating in a portion of the hub region enters the paths and makes a number of reflections while travelling along a path. By such reflection, the light is reduced to a semi-collimated condition before being emitted from the assembly.

A further aspect of the present invention is to provide a novel and improved light collection assembly wherein a plurality of mirrors are arranged along a spiral-like curve and are placed such that light is beamed from one mirror to another along said curve. The angular divergence of the light beam is kept constant or is continuously decreased.

A still further aspect of the present invention is to provide a novel and improved rotatable optical connector. This connector employs both light distribution rod and spiral mirror technology in accordance with the present invention to transmit light across the gap between two relatively moving connector parts.

These and other aspects of the present invention will become readily apparent from a consideration of the following specification and claims taken in conjunction with the accompanying drawings.

BRIEF DESCRIPTION OF THE DRAWINGS

FIG. 17 is a sectional view of a fifth embodiment of a hybrid light fixture of the present invention;

FIG. 18 is a sectional view of a light fixture including the light distribution assembly of the present invention;

FIG. 19 is a diagrammatic plan view of the light collection assembly of the present invention;

BEST MODE FOR CARRYING OUT THE INVENTION

Figure 1:
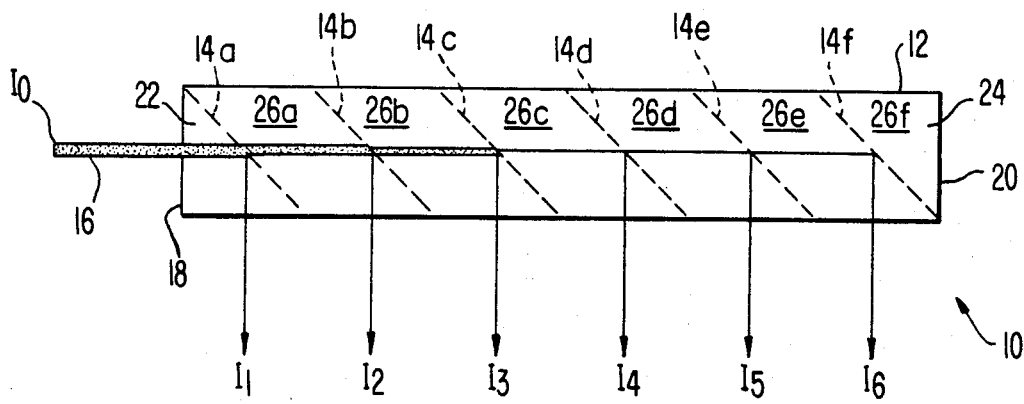
FIG. 1 is a diagrammatic view of a light distribution assembly of the present invention.

FIG. 1 illustrates a relatively simple light distribution assembly 10 which will operate effectively to distribute light that originates as a substantially parallel beam into a uniform pattern. This assembly includes a light conducting rod 12, such as a transparent glass rod of rectangular cross-section having six beam splitting mirrors 14a-f imbedded therein. A substantially parallel beam of light $I_o$ shown at 16 is assumed to be entering the rod 12 from the left exactly perpendicular to the left-hand face of the rod. This left face serves as an input optical window 18 for the incoming light. The light beam 16 may originate from a laser or other known source of parallel light, and it is further assumed that the input optical window 18 is being uniformly illuminated by said input light. Without the presence of the beam splitting mirrors 14a-f, the light entering the input window would pass entirely through the transparent glass rod 12 and would exit from the right-hand side 20 thereof. The light exiting from the right-hand side would have substantially the same intensity as the entering light minus optical losses due to absorption and reflection at the interfaces.

In FIG. 1, the six beam splitting mirrors 14a-f have been placed in a series so as to intersect the light beam passing through the rod at an angle of exactly 45°. The mirrors have been arranged so that they entirely fill the available space within the rod without overlapping one another. Any vertical line drawn through the rod will intersect one, and only one, beam splitting mirror. Any horizontal line passing through the rod will intersect all six mirrors. Having the six beam splitting mirrors exactly fill all the available volume in this manner places a constraint on the rod; namely, that it be six times longer than it is thick in this example. Other rods could be devised having a different number of mirrors which would in turn allow a different ratio of length to thickness. In all cases, the length must be an integer multiple of the thickness.

Beam splitting mirrors 14a-f are of a known type which have the property of reflecting some light while allowing the remaining light to pass through. One method of constructing such a mirror is to begin with a glass surface and to vacuum deposit silver or aluminum on its face. Such a beam splitting mirror can subsequently be imbedded within a glass object by securing a second piece of glass directly onto the vacuum deposited mirror surface using special optical adhesives. Preferably the adhesives should have the same index of refraction as the surrounding glass. Once imbedded in the glass, such beam splitting mirrors should have negligible light absorption.

In the example of FIG. 1, the rod 12 would be made of seven pieces of optical quality glass or plastic which include two right triangular prisms 22 and 24 and five 45° parallelogram prisms 26a-f. Silver, aluminum, or the like would be vacuum or chemically deposited on the hypotenuse face of the prisms 22 and 24 and upon the opposed inclined faces of the remaining prisms 26a-f to form the mirrors 14a-f. The individual prisms are then secured together to form the rod 12 of FIG. 1 using optical adhesives.

It is evident from examining FIG. 1 that by choosing the proper reflectivity for each beam splitting mirror 14a-f, the light entering the optical window 18 can be exactly divided into six parts of equal intensity which are then beamed out of the rod in a direction perpendicular to the initial direction of travel. If the initial light beam 16 has a width equal to the thickness of the rod 12, then, by the geometry stated above, each of the emerging light beams $I_1$, $I_2$, $I_3$, $I_4$, $I_5$, and $I_6$ will also have a width equal to the thickness of the rod 12. Under ideal conditions, the six emerging light beams will be exactly side by side and thus be merged into a single light beam having a width equal to the length of the glass rod, or six times the rod thickness in this example. The initial light beam 16 has thus been spread over a much wider width while still retaining its parallelism. Although lens systems could be devised to produce a similar beam width spread, such systems would be unwieldy, whereas the distribution assembly 10 performs the function using a compact rod. Furthermore, by increasing the number of beam splitting mirrors 14 in the rod, the rod can be made long and narrow and therefore suitable for many possible applications.

If all of the mirrors 14a-f of FIG. 1 have the same transmission to reflectivity ratio, the resulting six secondary light beams $I_1$-$I_6$ will have unequal intensities and uniform light distribution will not be achieved. If, for example, each beam splitting mirror were given a 5:1 ratio (i.e., five parts transmitted and one part reflected) then the light intensity reflected by each mirror would be:

$I_1 = (1/6)I_0$, $I_2 = (5/36)I_0$, $I_3 = (25/216)I_0$,
$I_4 = (125/1296)I_0$, $I_5 = (625/7776)I_0$, and
$I_6 = (3125/46656)I_0$ which is not the desired even light distribution.

The desired even distribution of light, $I_1=I_2=I_3=I_4=I_5=I_6=(1/6)I_0$, can be achieved using the following mirror reflectivities:

| Mirror # | Light Reflection Ratio (Transmitted/Reflected) | Mirror Reflectivity |
| --- | --- | --- |
| 14a | 5:1 | 16.67% |
| 14b | 4:1 | 20.00 |
| 14c | 3:1 | 25.00 |
| 14d | 2:1 | 33.33 |
| 14e | 1:1 | 50.00 |
| 14f | 0:1 | 100.00 |

The method used to determine the reflectivity of six mirrors can be generalized to a rod having any number of mirrors. The general formula for the reflectivity of the ith mirror becomes:

$$R_i(\text{percent}) = \frac{100}{N + 1 - i}$$

Thus each beam splitting mirror in a light distribution rod 12 must be made with a different reflectivity. The first mirror in the series is given a low reflectivity while the last mirror must be completely reflective to reflect the remaining light into the secondary beam. For best results, the reflectivity of each mirror must be controlled to within a few percent in the manufacturing process.

As previously indicated, a light distribution rod 12 can be made any desired length by adjusting the dimensions of the rod and the number of mirrors within the rod. However, once designed and fabricated, no further adjustments can be made to the rod length without adversely affecting a uniform light distribution. It would, however, be possible to cut off the end 20 of the rod and allow the remaining horizontal light flow to pass into some other light fixture, or back into some other light distribution system, or the like. Alternatively, the cut end could simply be coated with a light absorption substance, such as black paint, thus sacrificing the remaining primary light flow. Coating a cut end with a reflecting substance would disturb the uniformity of the light flow and would therefore not be desirable.

Another observation to be made relative to the light distribution rod 12 is that the light flow is not reversible. For example, consider a light beam entering the rod in a direction exactly reversed to that of secondary light beam $I_5$ in FIG. 1. This reverse light beam, $-I_5$, would first encounter mirror 26e which is 50% reflective. Half of the $-I_5$ light beam would therefore pass through the mirror 26e and out of the top surface of the rod. The remaining light would be reflected in the direction of a reversed main flow, $-I_0$. It would then encounter mirror 14d which is 33.33% reflective. Therefore, one third of the remaining $-I_5$ light flow would again be reflected out of the top of the rod. It can be seen that this loss of light out of the top of the rod would continue with each successive encounter with a beam splitting mirror until the beam reached the input optical window 18 on the left. By the time the light beam $-I_5$ reaches the input optical window, it would only have an intensity of 16.67% of its original value. The placement of a mirror along the top surface of the rod 12 would make the internal reflections of the $-I_5$ light beam more complex, but would not increase its transmission through the input optical window 18. Thus the light distribution assembly 10 has some of the properties of an optical diode and although it is well suited as light distribution means, it is impractical as a light collector means due to its diode properties.

The light distribution assembly 10 could be used to create multiple images along the length of the rod 12 of some original input image directed onto the input window 18. However, such image reproduction would require high precision of the individual optical elements, and would additionally require the original image to be superimposed on the input window by an exactly parallel light beam, such as a laser beam. Although such image reproduction may prove useful in some specialized applications, the light distribution assembly 10 is primarily intended for use for the distribution of light for illumination or for communication signals where the intensity of the light is of principle consideration, and where polarization, image integrity, and other such parameters may be ignored.

The beam splitting mirrors formed by the vacuum deposition of a reflective metal on the glass or plastic substrate could be replaced by other mirror means. Changes in the index of refraction will reflect a portion of a light beam, and this effect could be used as a beam splitter by using thin films of relatively high or relatively low index of refraction at the prism interfaces. Alternatively, the parallelogram prisms could be made with different indices of refraction so as to cause the required reflectivity. These methods of making beam splitting surfaces would have zero optical losses, but they would not work when high reflectivities are required. Dielectric film mirrors could be used to advantage as beam splitting mirrors in some variations, and alternatively, pellicle mirror type films having the required reflectivity could be cemented between the prism elements using optical adhesives.

Figure 2:
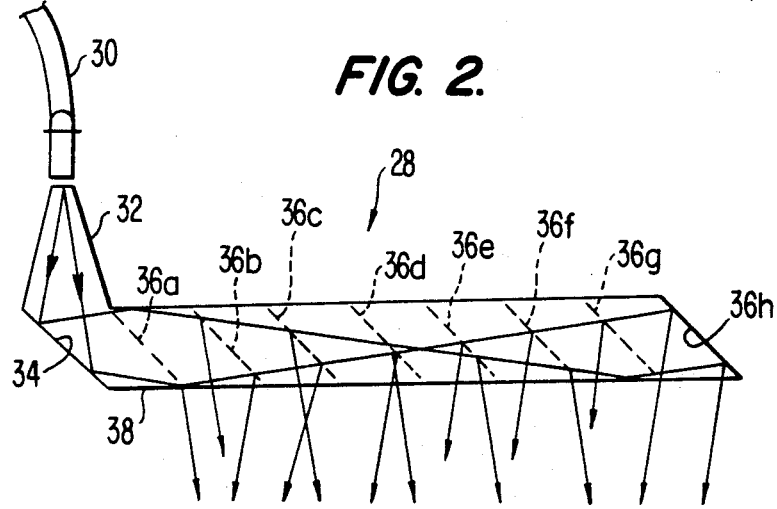
FIG. 2 is a diagrammatic view of a second embodiment of a light distribution assembly of the present invention.

Another embodiment of a light distribution assembly of the present invention is shown generally at 28 in FIG. 2. In this embodiment, the input light enters from above by means of a lightpipe 30 and a cone shaped input unit 32, and is then reflected by a 45° mirror 34 into a substantially horizontal beam. As described in connection with FIG. 1, the horizontal light beam encounters a series of beam splitting mirrors 36a–h in a light distribution rod 38 which direct the light flow downwards to produce a substantially uniform illumination. The beam splitting mirrors have reflectivity ratios, as indicated in connection with the light distribution assembly 10 of FIG. 1, which provide secondary output beams of substantially equal intensity. The end prism has been removed from the right side of the rod 38 since it is redundant, but otherwise the construction of the rod 38 is similar to that of the rod 12 of FIG. 1.

The very important conceptual change of beaming non-parallel light into the rod 38 is disclosed in FIG. 2. Light from a lightpipe coupler 30 having a small angular divergence is beamed directly into the rod 38 by means of the cone shaped input unit 32 and mirror 34. Because of this angular divergence, some of the light will encounter the top and bottom sides of the rod as it passes therethrough. Since this diverging light is encountering the sides at shallow angles, it will be reflected back into the rod by the action of total internal reflection, as shown. The nature of this geometry is such that the light emerging from the light distribution rod will have the same angular divergence as the light which enters. Thus the emerging light beam has the same characteristics as the input light except that it has been uniformly spread out along the length of the rod. The uniformity of the emerging light is insured by the averaging of the light over the entire range of angles and positions of the input light rays, of which only two light rays are shown here.

The possibility of inputting low angular divergence light beams into a light distribution rod as shown in FIG. 2, makes feasible many possible practical applications of this device in the field of white light illumination using lightpipe or conventional light sources. As will be subsequently illustrated, this feature also makes it possible to use curved light distribution rods which further extends the usefulness of such rods for light fixture applications. Light distribution rods used for lighting would, in practice, be held in place by various brackets and housings. In order to preserve the properties of total internal reflection at the points of contact between the rod and the brackets and housings, it would be expedient to coat the entire rod with a relatively low index of refraction coating. This coating should have a thickness of greater than approximately ten times the wavelength of the light passing through the rod to insure a very low light leakage.

In FIG. 2, light is shown entering the light distribution rod 38 through a cone shaped light transmitting input unit 32 on the left side which is positioned perpendicular to the rod. It is also possible to beam the slightly diverging light beam directly through the end as was done in FIG. 1. Alternatively, it would also be possible to place the cone shaped input unit 32 at some intermediate position between the vertical and horizontal angles by suitably adjusting the angle of the 45° input mirror 34.

Figure 3:
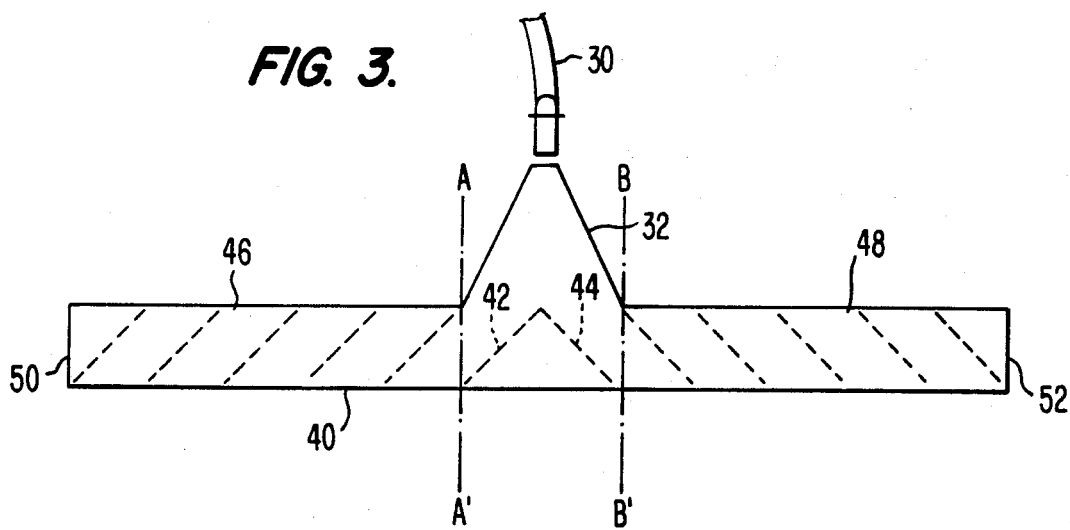
FIG. 3 is a diagrammatic view of a third embodiment of a light distribution assembly of the present invention.

In a still further embodiment of the invention illustrated in FIG. 3, the input cone 32 is located at a horizontal position midpoint along the length of a rod 40. In order for the midsection between A-A' and B-B' to receive equal illumination, two oppositely directed 45° input mirrors 42 and 44 are employed, and these input mirrors should be beam splitting mirrors having a reflectivity of:

$$R_{45° \text{ input mirror}} (\text{Percent}) = \frac{100(n-1)}{N}$$

$$(i = 1)$$

In the above equation, N refers only to the number of beam splitting mirrors in the series following the input mirror 42 or 44 and including the input mirror in the count, so in FIG. 3, two six mirror series are shown. The input mirrors could be labeled $i=1$ with the succeeding beam splitting mirrors being labeled $i=2, i=3$, etc., moving away from the source of light. Using this labeling system, the equation above can be used to determine the reflectivity of the beam splitting mirrors following the input mirror. The light distribution rod sections 46 and 48 of the rod 40 with imbedded beam splitting mirrors are formed in the same manner as the rod 12 of FIG. 1.

The input cone 32 could also be positioned at some position intermediate between the midpoint of the rod 40 and one end. In such a case, the triangle formed by the two input mirrors 42 and 44 would not be placed directly under the midpoint of the input cone. Instead it would be moved more toward the nearest end of the light distribution rod 40 in such a manner so as to serve as a light divider. This light divider would thereby be arranged to beam more light towards the longer leg of the rod with a ratio that exactly gave an equal light distribution along the full length of the rod. The exact placement is dependent upon the angular distribution of the input light beam intensity.

Another possible variation of the assembly of FIG. 3 can be achieved by adding a light transmitting cube directly above the two 45° input mirrors. The input cone section 32 could then be affixed to any of the remaining five exposed faces of the cube and a 45° fully reflecting mirror could be imbedded in the cube section to deflect the light beam downwardly toward the two input mirrors 42 and 44. In this way, light could be entered into the rod 40 from side positions, or from positions parallel and above the rod, or the like. Various intermediate angular positions are also possible using this modification and ideas expressed earlier.

Figure 4:
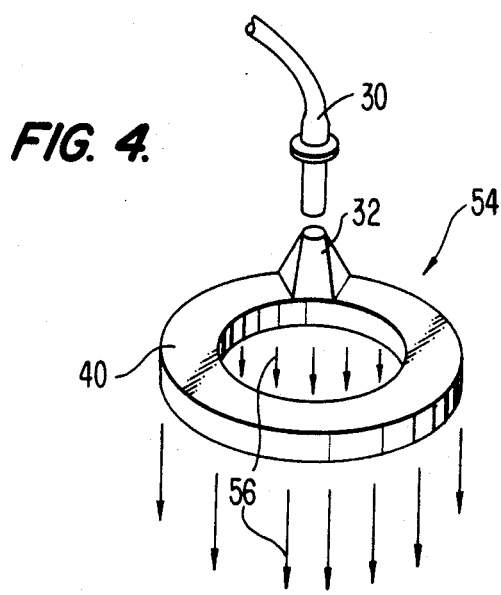
FIG. 4 is an exploded perspective view of a fourth embodiment of a light distribution assembly of the present invention.

In FIG. 3, right triangular prisms have been added to both ends of the light distribution rod as in FIG. 1 to give the rod 40 a rectangular profile which may prove convenient in attaching the rod to a housing. This concept of a fully rectangular rod also makes it evident that if the rod 40 were flexible, the rod could be bent in a circle and the left and right ends 50 and 52 respectively could be glued face to face. The resulting circular light distribution assembly 54 is shown in FIG. 4. As indicated by the arrows 56, the output or secondary light in this case would be distributed in a circular ring and beamed downwardly.

By taking the light distribution rod 40 of FIG. 3 and bending it in a circle about different axes, the secondary output light can be selectively beamed outwardly from the circular rod, inwardly, upwardly or downwardly. This is accomplished by bending the rod to selectively reposition the output side or face of the rod 40 which is shown as the bottom face in FIGS. 3 and 4. This case could just as well be a side or top face of the circular light distribution rod. By using the previous teachings it is evident that the input cone 32 could be placed on any convenient side of the resulting circular rod 40 and it could be positioned at any convenient angle.

It is evident that further extensions of the light distribution rod concept are possible. A light distribution rod can be formed into any type of closed or open curve provided that the radius of curvature is not small in comparison to the beam splitting mirror spacing. Curves in all three dimensions are possible, and a rod can have both curved and straight segments. A light distribution rod can even be given a twist if desired, and preferably should be constructed of some transparent, flexible plastic which would allow it to be bent into any desired curve. The flexible plastic may be of a type which retains its shape after bending or it may return to its normal shape upon release of the bending pressure.

Figure 5:
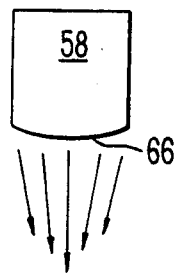
FIGS. 5–8 are cross-sectional views of light distribution rods used with the light distribution assembly of the present invention.
Figure 6:
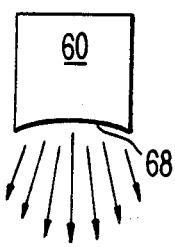
Figure 7:
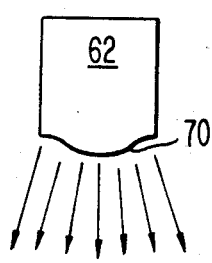
Figure 8:
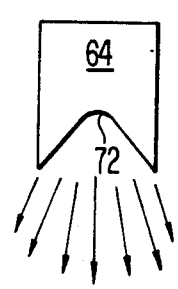
Figure 9:
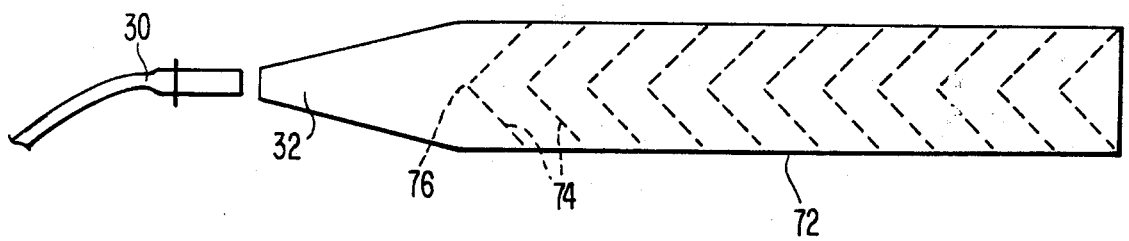
FIG. 9 is a diagrammatic view of a fifth embodiment of the light distribution assembly of the present invention.

Until now, only light distribution rods having rectangular cross-sections have been considered, but other cross-sectional shapes are also possible. Cross-sectional views of light distribution rods 58, 60, 62 and 64 are shown in FIGS. 5, 6, 7, and 8 respectively where the radiating faces 66, 68, 70 and 72 have been given a curve. In FIG. 5, the curve of the face 66 is convex which causes the light to come to focus in front of the rod 58. In FIG. 6 the curve of the face 68 is concave which causes the light to diverge from the rod 60. In FIG. 7 a combination curve is applied to the face 70 which emits higher intensity light in the downward direction and less light off to the sides of the rod 62. In FIG. 8, the curved face 72 emits more light to the sides of the rod 64 and less light downwardly. It is also possible for two, three, four or more light distribution rods to be glued together back to back to form a single rod assembly which distributes its light in several directions simultaneously. However, drastic modifications of the cross-section are generally not possible without introducing inhomogeneities in the light emission. For example, a light distribution rod having a circular cross-section and flat beam splitting mirrors would produce a light emission that varies sinusoidally in intensity along the length of the rod. However, it is possible to provide a light distribution rod 72 having a circular cross-section using beam splitting mirrors 74 that are not flat as illustrated in FIG. 9 (shown in cut-away profile). In this configuration, the 45° flat beam splitting mirrors have been replaced with circular cone-shaped beam splitting mirrors 74. These cone-shaped mirrors have an apex angle of 90° with their apexes 76 pointed toward the light source. The reflectivity of the individual beam splitting mirrors is the same as that for a flat mirror system, and their reflectivity can be calculated using equation given with respect to the flat mirrors of FIG. 1. For the rod 72 to give off an even distribution of light in all perpendicular directions, the beam splitting cone mirrors 74 must be exactly centered within the rod with their apexes 76 lying along the central longitudinal axis of the rod. The various placements of the input cone means 32, and the various curved rod configurations discussed previously for light distribution rods having rectangular cross-sections can also be applied to circular cross-section rods.

An uneven light distribution can be obtained from the rod 72 of circular cross-section by positioning the beam splitting cone mirrors 74 off-center. A minimum light intensity would be radiated from the side of the rod nearest the cone apex. Light distribution rods having cone mirrors (either centered or off-centered) may have a wide variety of cross-sectional shapes without adversely affecting the light distribution along the length of the rod. Thus, cone mirrors make possible oval, star-like, rectangular, pentagonal, hexagonal, and many other regular and some irregular cross-sectional shapes. However, most of these shapes would not yield a uniform light emission around the rod circumference.

The input truncated cone 32 illustrated in FIGS. 2, 3, and 4 would typically have a female connector fabricated at its end if the light is being beamed into the light distribution rod by means of lightpipes 30. If the light source is a laser, the input cone may be eliminated and replaced by a lens system. The input truncated cone may have built-in lens surfaces including compound lenses having different relative indices of refraction. Also the cone may be replaced by a wide variety of alternative geometries, such as a frustum of a pyramid, a rectangular parallelepiped, a prism or cylinder, or the like. The input extension may also be replaced directly by a light means such as an incandescent bulb and reflector arrangement. The input truncated cone 32 should therefore be considered symbolically in these teachings as representative of one of an entire class of light input means.

A wide variety of surface effects may be added to a light distribution rod of the types illustrated in FIGS. 1–4. The rod may be sandblasted to give a roughened surface that scatters the emitted light, or a similar effect may be obtained by molding an irregular bumpy surface to the outside of the rod. Various colored, translucent, protective, patterned, and the like coatings may be applied to rod, or ornamentation of various types may be affixed to the surface. Likewise, such rods may be designed as part of more complex optical devices or fixtures. Light scattering effects can also be achieved by fabricating the beam splitting mirrors with irregular surfaces and/or by doping the glass rod itself with light scattering particles.

Returning to the concept of a rectangular light distribution rod having a rectangular cross-section, it becomes evident that if the rod is bent into a circle, the flat beam splitting mirrors will deform into a curve. Calculations show that this curve is a logarithmic spiral having the general form (in polar coordinates) of:

$$r = r_o \theta^{\theta \tan \gamma}$$

where $r_o$ is the inner radius of the torus-shaped rod and where $\gamma$ is the average angle of approach of the light ray to the mirror surface.

Figure 10:
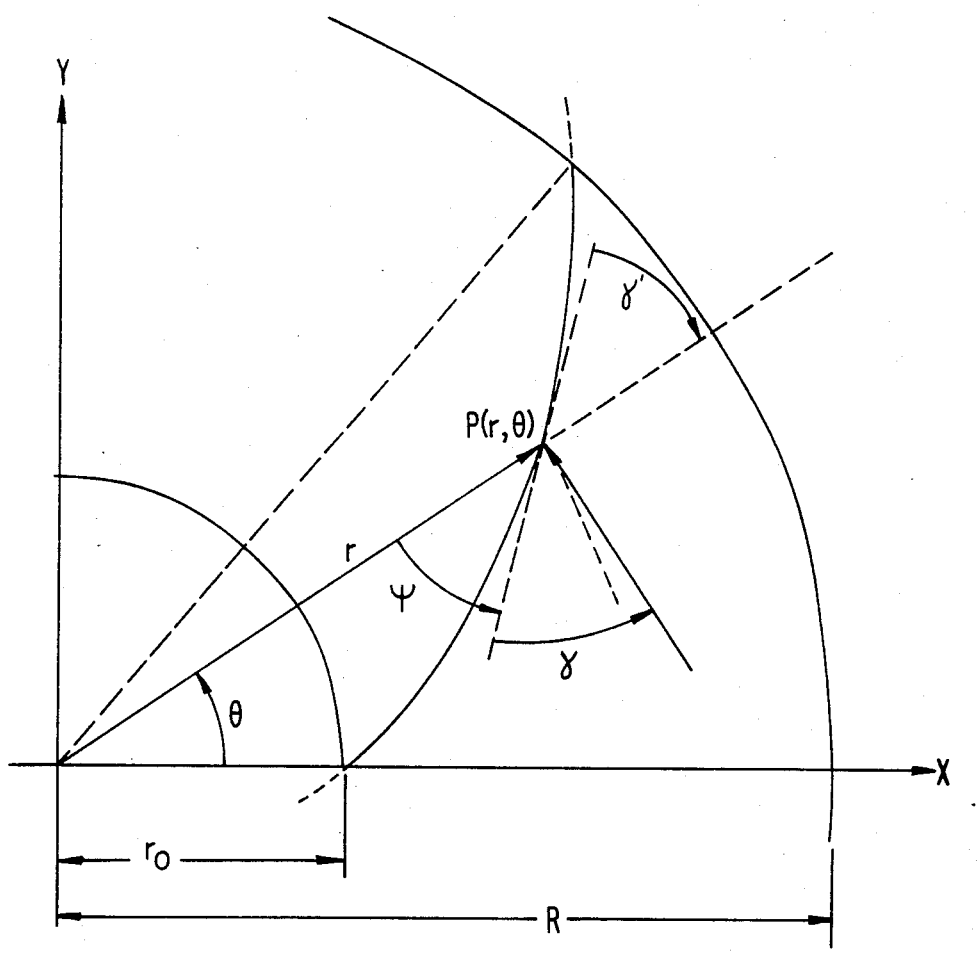
FIG. 10 is a diagrammatic illustration of the geometry for a beam splitting spiral mirror.
Figure 11:
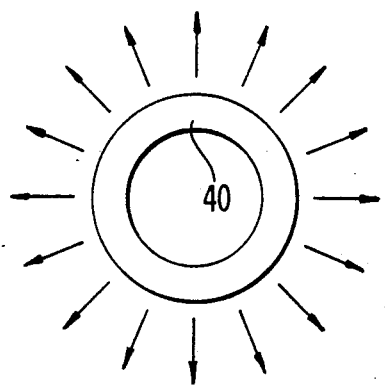
FIG. 11 is a plan view of a light distribution rod for a light distribution assembly of the present invention.

The geometry for the beam splitting spiral mirror is illustrated in FIG. 10. Here the light distribution rod is bent into a circle with the radiating surface being the outer side of the resulting torus as shown in FIG. 11. The inner radius of the torus is $r_o$ and the outer radius is R. The origin (x=0, y=0) is chosen so that the curve of the beam splitting mirror intersects the x-axis at the same position that the inner circle, of radius $r_o$, crosses the X-axis. The point $P(r,\theta)$ is some arbitrary point along the mirror curve.

This geometry results in the logarithmic spiral curve having the specific form:

$$r = r_o \theta^\theta$$

Where $\tan \gamma = \tan 45° = 1$.

The beam splitting mirror in the ring configuration of FIG. 4 would have a more complex shape consisting of a superimposed mapping of the spiral shape in the plane of the torus and the 45° skewed angle of the mirrors as viewed perpendicular to the rim. Similary the cone mirrors in the circular cross-section of FIG. 9 would have a superimposed mapping of the spiral configuration onto the cone shape when the light distribution rod was bent into a ring. The mid-section input light distribution rod of FIG. 3 would have both clockwise and counterclockwise spiral arms when it is bent into a ring configuration.

It can be noted that even if very parallel laser light is beamed into a ring shaped light distribution rod, the emitted light will have an angular divergence of +δ° where δ is the angular spread at which the light approaches the spiral mirror. This angular spreading of the light can be reduced by decreasing the width, $R-r_o$, of the torus and by consequently increasing the number of spiral mirrors.

In specific applications, the basic logarithmic spiral curve may be modified. For example, by changing the angle $\gamma$ to something other than 45°, the light can be made to exit the circular light distribution rod at an angle skewed to the perpendicular. If the geometry of the light entering a ring shaped light distribution rod is known, such as light from a point source of laser, the spiral curves could be modified to eliminate the increased angular divergence of the emitted light mentioned earlier. If the curvature of the rod is not circular, then the exact mirror shape would have to be recalculated.

A non-linear distribution of light along a light distribution rod can be achieved by modifying the general beam splitting mirror reflectivities as expressed in the equation given with respect to the mirrors of FIG. 1. However, in general this would result in a loss of uniformity as well as loss in linearity since the light emitted by individual mirrors would not in general merge between adjacent mirrors, thereby resulting in a segmented light output. This problem could be solved by having the reflectivity vary by some calculated amount across the face of each individual beam splitting mirror. This would very often result in increased complexity of fabrication of the light distribution rods.

The great flexibility of the light distribution rods of the present invention opens up whole classes of applications. The light distribution rods illustrated in FIGS. 1 through 11 are analogous to the fluorescent bulbs used in conventional fluorescent lighting fixtures. In such fixtures, little change need be made to the reflector, lens and housing portion of the fixture while the electric wiring is simply replaced by the lightpipe connector means. Design of these fixture elements therefore, would be similar to existing fixtures. Generally such fixtures would employ the straight type light distribution rods as illustrated in FIGS. 1 and 2 or the ring type rods as illustrated in FIG. 4, although other configurations are possible. Since the rods can be designed to only emit their light along one face instead of in all directions, such rods can deliver a greater percentage of their output into the working area of a room. However, rods of circular cross-section, as in FIG. 9, can also be made to exactly mimic the light output of a fluorescent bulb.

Lightpipe distribution networks using light distribution rods are of particular value when the input illumination is obtained from special solar panels which collect the sunlight and beam it without conversion into the network. Thus free solar light is obtained for room lighting in offices and commercial establishments for use in daylight hours. During cloud cover or evening hours, conventional electric lighting must be switched on by automatic electric switching. Thus both solar lightpipe illumination and conventional electric illumination must be made available simultaneously. One approach to providing this dual lighting service for a room is to fabricate hybrid solar-lightpipe/electric-bulb type lighting fixtures. The lightpipe fixture may beam light directly into the room and may use lenses, prisms and mirrors to help distribute the light; it may employ lightpipe bulb means which distribute the input light by various diffusion methods around its surfaces; or it may use light distribution rods of the type herein described to distribute the input light. The electric fixture portion of a hybrid fixture may make use of incandescent, arc lamp, fluorescent, neon, or the like type electric lamps and related electrical input means to generate and distribute artificial light within the hybrid fixture.

Figure 12:
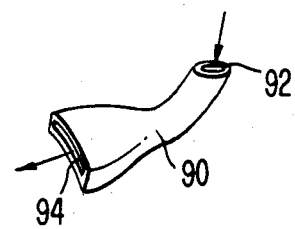
FIG. 12 is a perspective view of an adaptor for a hybrid light fixture of the present invention.
Figure 13:
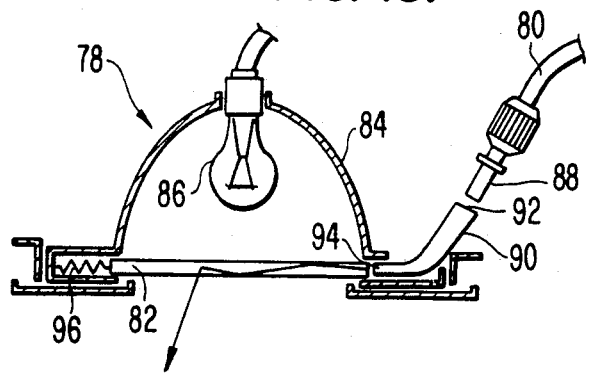
FIG. 13 is a partially sectioned view of a hybrid light fixture incorporating the adaptor of FIG. 12.

FIGS. 12 and 13 illustrate a hybrid lighting fixture 78 wherein light from a lightpipe input cable 80 is distributed by a flat sheet of glass 82 which is mounted across the bottom of a housing 84 for a conventional electric incandescent bulb 86. The lightpipe input cable provides light through a connector 88 into a light conducting adaptor 90 which in turn beams the light into the edge of the glass sheet. The adaptor 90 has a circular cross-section 92 at the connector end and a flared oval or rectangular cross-section 94 at its output end adjacent the edge of the glass sheet 82. The light beam passing through the adaptor is thus flattened so that it can enter the glass sheet with minimum loss. Light is trapped within the adaptor 90 and the glass sheet by the action of total internal reflection. The rim/edge of the glass sheet is assumed to have a reflective surface everywhere except where the light is input by the action of the adaptor. The glass sheet may be formed to provide light scattering by being sandblasted on one or both of its faces, or being made of some translucent material, or the like. The sheet 82 is held in place by a spring latching catch 96 which also serves to press the sheet firmly against the flared end 94 of the adaptor. This glass sheet light distribution arrangement allows light from the conventional electric bulb 86 to beam through while also being diffused and scattered by the sheet light scattering surface. Variations of this arrangement are possible whereby the sheet has a curved surface or where some other source of artificial illumination is used.

Figure 14:
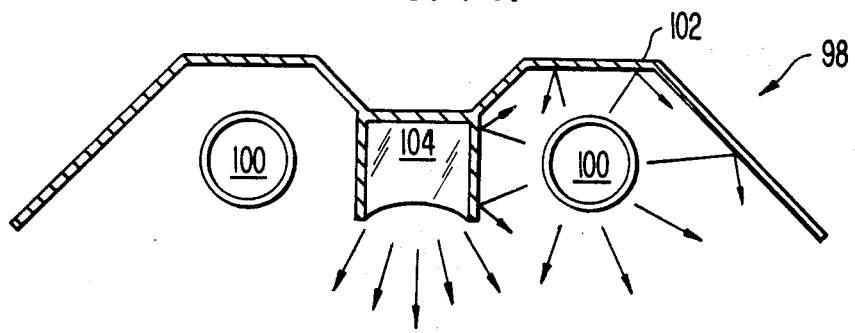
FIG. 14 is a sectional view of a second embodiment of a hybrid light fixture of the present invention.

The light distribution assemblies including the light distribution rods illustrated by FIGS. 1–9 may be readily incorporated in hybrid lighting fixtures. FIGS. 14–17 illustrate hybrid light fixtures (in cross-section) which incorporate such light distribution rods to distribute light and which use fluorescent light bulbs as a source of artificial light. In FIG. 14, a conventional fluorescent light fixture 98 using long straight fluorescent bulbs 100 mounted within a reflective housing 102, is modified by the addition of a rectangular light rod 104 between the two fluorescent bulbs. This light rod is provided with light by a cable and connector of the types previously shown, and has the cross-sectional configuration of the rod 60 of FIG. 6.

Figure 15:
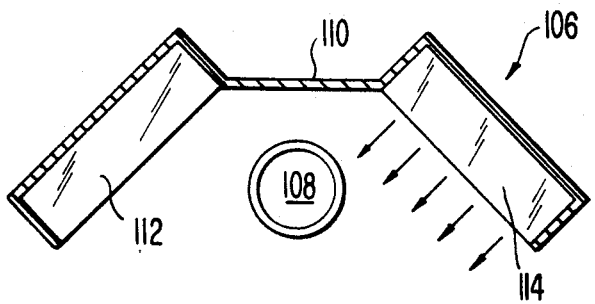
FIG. 15 is a sectional view of a third embodiment of a hybrid light fixture of the present invention.

FIG. 15 discloses a hybrid light fixture 106 having a single fluorescent bulb 108 mounted within a housing 110. Two rectangular light distribution rods 112 and 114 of the type shown in FIGS. 1 and 2 are mounted on the housing on either side of the bulb 108.

The light distribution rods 104, 112 and 114 in FIGS. 14 and 15 are straight rods which extend substantially parallel to the adjacent flourescent tubes, and transparent lens covers can be mounted to cover the bottom portion of the fixtures 98 and 106 and given a suitable molded rippled finish which would serve to further diffuse the emitted light.

Figure 16:
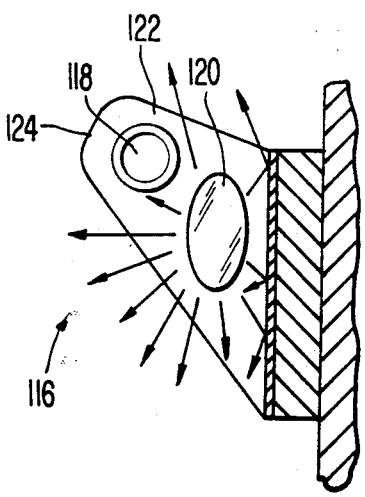
FIG. 16 is a sectional view of a fourth embodiment of a hybrid light fixture of the present invention.

In FIG. 16, a wall mounted hybrid fixture 116 is illustrated such as may be used over a bathroom mirror. A straight fluorescent tube 118 is mounted in parallel with a straight light distribution rod 120 of equal length within a housing support 122. The light distribution rod is of the type shown in FIG. 9 which emits light in all radial directions. In FIG. 16, the rod 120 is shown having an oval cross-section for increased light distribution in the forward direction. A lens cover 124 of plastic or glass which may include light diffusion means to increase the uniformity and angular spread of the light is attached over the tube 118 and rod 120.

In FIGS. 15 and 16, some light emitted by the fluorescent bulbs will impinge on the light distribution rods. As discussed previously, light which enters a light distribution rod in the reverse direction, for the most part, is returned back towards its source after undergoing multiple reflections. The rods thus perform as a diffusion reflector for fluorescent light striking them.

Hybrid lighting fixtures could also include light distribution rod-incandescent bulb combinations. Of particular interest would be designs similar to that of FIG. 17 wherein a circular light distribution rod is combined with a conventional incandescent electric light bulb and socket. In this compact combination, the circular light distribution rod 126 forms a collar portion around the electric light bulb socket 128. Here the circular light distribution rod has a concave lens face which is angled to spread the light downwardly in accordance with the teachings of FIG. 6.

A cylindrical light distribution rod can be made very short, perhaps having only 2 or 3 beam splitting mirrors with less than 100% reflectivity imbedded therein. For example, the mirror reflectivities could be designed for a four mirror rod with the last mirror omitted as though the end portion of the four mirror rod was cut off. The curvature of the external surfaces could be arranged so that the short rod gives off a uniform light in all directions in one hemisphere. This short cut-end rod would then give off the same light distribution as a conventional incandescent electric bulb.

Light distribution rods can be interspaced between conventional electric bulbs in a variety of hybrid fixtures that closely resemble conventional multi-bulb lighting fixtures. Also these rods can be used in non-hybrid lighting fixtures that use only a light distribution rod in a conventional light fixture type housing.

A very simple ceiling mounted connector and socket assembly 130 is illustrated in FIG. 18. wherein a light distribution rod of the type shown in FIG. 9 is shown plugged into the socket portion of the assembly. The fixture is shown mounted through a hole 132 in a fiberboard hanging ceiling panel 134. A thin faceplace 136 is attached to a socket 138 and serves as a wide flange that grips the ceiling panel on the room side of the assembly. This faceplate may be made very inconspicuous by painting it the same color as the ceiling tiles or it may be made decorative. A number of spring metal clips 140 attached to the socket press against the back side of the ceiling panel and thus aid in holding the connector/socket assembly within the hole in the ceiling panel. Many other types of brackets, nut and washer means, or other fastener means may be used to hold the connector/socket assembly in place on the ceiling panel. However, the spring clip method, or some variation thereof, allows the connector/socket assembly to be inserted into the ceiling tile hole from the room side without having to have access to the back side of the ceiling panel.

In FIG. 18 a cut-end light distribution rod 142 is shown plugged into the socket 138. A reflector 144 is affixed directly to the cut-end light distribution rod. Light is provided to the input end 146 of the light distribution rod by means of a light conducting cable 148 and a connector 150 including a 45° prism 152.

Light distribution rods of the type disclosed herein can be used in a great number of applications in addition to lighting fixtures. Such rods can be used to distribute heat in the form of infrared radiation into the interiors of rooms by installing them in fixtures that closely resemble fluorescent lighting fixtures, having lens and mirror elements that are particularly suitable for distributing infra-red radiation. These heat distribution rods could be installed inside hot water tanks to heat the water therein, and containers of chemicals, food or other substances could be heated by these rods in factories, businesses, homes or the like. Circular rods of the type shown in FIGS. 4 and 11 could be installed around the inside walls of any container to heat the contents therein. In particular such circular rods could be installed around the walls of pipes to heat various types of fluids passing through them.

Light distribution rods could also be designed for optimum efficiency in distributing ultraviolet light. Such rods would be of particular value in killing bacteria, some insects, and other biological containments. They could be installed in many out-of-the-way locations in food processing plants, hospitals, water purification plants, and the like.

The light distribution rods and rod assemblies of the present invention take light from a substantially parallel beam and distribute this light over an extended area. Conversely, it is often necessary to collect light from an extended light source and reduce it to a substantially parallel light beam which can thereafter be manipulated by conventional lenses, mirrors, prisms, and the like. A typical optical design situation involves using a parabolic mirror to beam light from a non-point source electric light bulb into an optical system that requires a source of optical illumination. The resulting light beam is usually very wide, not very parallel, and is often unable to include a large percentage of the emitted light in the resulting light beam. The multiple reflection mirror assemblies of this invention are able to collect light from an extended light source and to reduce it to a relatively narrow and parallel light beam. Furthermore, many of these mirror assemblies can be designed to occupy far smaller volumes of space than conventional lens and mirror systems. It is possible, for example, to use a modified Galaxy Mirror assembly in accordance with this invention to collimate substantially all the light emitted by a conventional fluorescent light tube lamp while occupying a volume no larger than a conventional fluorescent lamp reflector assembly.

In FIG. 19, a mirror assembly 154 is employed to take light from a point source and collimate such light into a narrow beam of light by means of an ensemble of spiral mirrors. Four spiral mirrors 156, 158, 160 and 162 direct light emitted from a point source 164 at the center of the assembly into a semi-collimated beam at the far end of the spiral mirror group. This spiral mirror assembly has been designated a "galaxy mirror assembly" or simply a "galaxy mirror" because of its resemblance to a spiral galaxy. In keeping with this name, usage, the circle at the center of the assembly is named the "hub" portion of the galaxy mirror and each spiral mirror may also be referred to as a "spiral arm" of the assembly.

An unusual feature of this optical device is that the individual light rays undergo a large, and sometimes indeterminate number of reflections in passing through the device. These multiple reflections cause "folding" of the light beam as a whole; i.e., portions of the light beam are superimposed on itself. This feature therefore makes the galaxy mirror useless as an imaging device. However, the symmetry of the galaxy mirror allows light emitted in all angular directions from the hub region to be collected into a single semi-parallel beam within the two-dimensional plane of the mirror assembly.

In FIG. 19, a light ray is shown passing from the source 164 in the hub region, through the mirror assembly, and into a lens 166 which directs the light into an optical fiber 168. It should be noted that conditions are arranged to cause the multiple reflected light ray 170 to be reflected from only one spiral mirror surface 158 during its passage through the optical device. The angle made between the light ray and the spiral mirror surface 158 continues to decrease as the light ray "orbits" the mirror system. This decreasing incidence angle causes the light beam to become increasingly collimated as it moves along its orbit. If conditions were arranged differently and a light ray, such as the example light ray, were allowed to strike the back side of the next innermost mirror 160 (assuming that the back side were reflective) then the light ray would diverge on each such encounter. This would cause the light beam as a whole to diverge instead of becoming a collimated beam. Therefore, the parameters of the galaxy mirror must be arranged so that light entering the galaxy mirror from the hub region at 164 only encounters one spiral mirror arm while undergoing multiple reflections.

The mirror system shown in FIG. 19 is a twodimensional system. In many applications of this configuration, the mirror surfaces would be extended perpendicularly in the third dimension for some distance, t. The entire galaxy mirror system would be placed between two flat plane mirrors, which were thus separated by a distance t. The space between two adjacent spiral arms would therefore form an enclosed mirror-walled channel having the spiral mirrors on either side and the flat mirrors on the top and bottom. In one application, the point source of light at the center of the hub could be a filament of some incandescent bulb as seen in cross-section. Components of the light emerging from such a filament in the X-Y plane would be reflected around the galaxy mirror as shown. The Z components of such light rays would be reflected between the top and bottom flat mirror surfaces until emerging at the sprial arm cut-off. The emerging light beam would be collimated in the X-Y plane, but in the Z direction the emerging beam would have the same angular divergence as it had when it entered.

The example light ray 170 is shown undergoing eight reflections before emerging from the galaxy mirror system. The same light ray can be expected to undergo additional reflections from the top and bottom flat mirrors due to an angular component in the Z direction. At perpendicular angles, the reflectivity of the best metallic mirror surfaces is around 96%. Ten reflections from such a mirror would result in the light intensity being reduced to about 66% of its initial value. However, the reflectivity of all mirror surfaces increases dramatically at shallow angles of incidence. In the galaxy mirror, light approaches the sprial mirror surfaces at increasingly shallow angles at increasing distance along the segmented orbital path. Thus, light could emerge from a galaxy mirror ensemble with 80% or better of its original intensity.

The galaxy mirror assembly 154 is made from a slab of high quality, high index of refraction optical glass (or plastic) having a thickness t. The spiral mirrors 156–162 are imbedded in the glass slab. Reflective surfaces would also be applied to the top and bottom surface of the glass slab to serve as the flat mirrors spoken of earlier. All mirror surfaces would consist of a relatively thick layer of low index of refraction glass (or plastic) followed by a highly reflective metallic film. Since most of the reflections in the galaxy mirror take place at shallow angles of incidence (as measured between the reflecting surface and the incoming light ray), the light rays will undergo total internal reflection upon encountering the relatively low index of refraction layer of glass. Light which approaches the mirror surfaces 158–162 at relatively high angles of incidence, such as the reflections made near the hub portion of the assembly, will pass through the low index of refraction glass and be reflected from the highly reflective metallic mirror film. By proper choice of materials and design parameters, most of the reflections in the X-Y plane can be made to take place within the critical angle limits, thus causing total internal reflection to take place (i.e., zero reflective loss). By this means, the reflective losses of light passing through the galaxy mirror assembly may reasonably be kept to 10 percent or less despite the large number of reflections.

The mirrors 156, 158, 160 and 162 are four involute of a circle spiral mirrors. The spirals begin at equal intervals around the hub circle 172 and all of them terminate along the same cut-off line 174. In this example spiral mirror 156 travels through 540° of arc while spiral mirror 162 only travels through 270° of arc. Mirrors 158 and 160 travel through intermediate arc distances. The greater length of mirror 156 allows light travelling along its surface to undergo greater convergence than light travelling along the other mirrors. For this reason, and for additional reasons to be subsequently presented, the gap between mirrors 156 and 158 is smaller than the gap between mirrors 160 and 162 at the cutoff line 174. Likewise the gap between mirrors 160 and 162 is still wider. A dashed line 176 shows the inner limit transversed by light rays travelling around the inner mirror 162. The gap between the dashed line and mirror 162 represents the region in which light orbiting mirror 162 will cross the cut-off line, and this width is greater than the gap between mirrors 160 and 162. The width of these gaps must be calculated or experimentally arrived at from knowledge of focusing properties of the light in a specific galaxy mirror assembly. In the optimum design, the width of these gaps is minimized to make the total emerging light beam as narrow as possible. These gap widths are adjusted by modifying the spiral curves near the cut-off line. The mirror 156 is a perfect involute of a circle spiral curve, while the curvature of the other three mirrors are involutes which have been modified somewhat by graphical methods in the region of the cutoff line 174.

A number of different variations may be made to the parameters of the mirror assembly 154 while still retaining the basic concepts of the preferred embodiment. The spiral curve may be an involute of a circle, a logarithmic spiral, a hyperbolic spiral, or any other type of standard or modified standard spiral curve. The concept can be extended still further to include any curve having a smoothly increasing radius of curvature along the section of interest. This expanded definition of spiral curves includes asymptotic curves or any curve segment which has a smoothly increasing radius of curvature.

The galaxy mirror 154 may include any number of spiral arms, although four are shown for purposes of description in FIG. 19. When only one, two or three spiral arms are used, the conditions required to achieve an acceptable convergence of the light generally become difficult to achieve in a practical device.

The beam width (which determines the gap width at the cut-off line) increases as the initial angular spread at the hub increases. The initial angular spread of the light entering a spiral mirror is given by:

$$\theta_{\text{initial angular spread}} = 360°/N$$

This equation assumes that the light originates from a point source at the center of the hub and N is the number of spiral mirror arms.

A graphical calculation of the gap width as a function of the number, N, of spiral mirrors was performed for one special case. The results of these graphical calculations show that for an unmodified galaxy mirror assembly having logarithmic spiral arms of the form $r = r_0 \epsilon^\theta$ (in polar coordinates) the beam width as a function of the number of mirrors is as shown in Table 1.

TABLE 1

| Number of spiral mirror arms | Approximate beam width at cut-off line |
|---|---|
| 6 | 9 ($2\pi r_o$) |
| 12 | 22 ($2\pi r_o$) |
| 36 | 130 ($2\pi r_o$) |

For this example, Table 1 shows that the beam width increases as the number of spiral arms increases, and the hub angle $\eta$ equals 45°. If the hub angle $\eta$ is reduced to zero or near zero, the beam width of the output beam can be greatly reduced. However, it is not possible to reduce the output beam width to less than that of the input beam width by this method.

The basic galaxy mirror assembly 154 as shown in FIG. 19 could be varied by designing an unequal distribution of spiral mirrors around the hub. In particular, the angular spacing between mirrors 156 and 158 would be increased where they meet the hub circle 172, while the angular spacing between mirrors 158 and the last mirror 162, in this case, would be decreased. The angular spacing around the hub 172 of the other spiral mirrors would be adjusted to vary smoothly between these two extremes. By this adjustment, the individual gap widths at the cutoff line 174 could all be made equal. Alternatively, both the initial angular positions and the gap widths (or channel widths) at cut-off 174 could be adjusted to optimize the over-all beam width at the cut-off line.

These parameters along with the placement choice of the cut-off line (exit aperture) can alternatively be adjusted to minimize the over-all area occupied by the entire galaxy mirror assembly. The type of spiral curves used can be chosen to optimize desired parameters. For example, the dashed spiral line 176 which represents the inner limit of orbiting light could be moved over against the back side of mirror 162 by appropriate choice of spiral curves and other parameters. By moving the inner limit line against mirror 162, the over-all area occupied by the galaxy mirror could be reduced.

A dashed line rectangle 178 in FIG. 19 shows the possible location of a 45° mirror or prism which could be used to bend the light output out of the plane of the galaxy mirror. Such "folding" of the galaxy mirror is possible along virtually any simple straight or curved line running through the assembly because of its flat configuration. This possibility allows the output beam to be directed in any desired direction. It also allows the galaxy mirror as a whole to be folded around obstacles in any device in which it is incorporated.

It would even be possible to affix the galaxy mirror to a curved surface without having to use additional mirror or prism means to bend the light flow if the curved surface were smooth and gradual. The galaxy mirror could be made of a flexible plastic that adopts to a variety of shapes without substantially altering its performance.

In FIG. 19 the hub portion of the galaxy mirror assembly is shown as a circle 172. Specifically, the circle is the unit circle from which the four involute spiral curves are drawn. Although it is often convenient to use the unit circle of the spiral curves as the hub, it is not necessary to this invention. The radius of the unit circle may be adjusted with respect to the spiral curves to choose the hub circle. The hub need not be a circle, but may instead be an oval, an ellipse, a square, a regular polygon, or some other compact space.

In FIG. 19, the cut-off line 174 is made perpendicular to the wall of mirror 162. The cut-off line could instead have been set at some other angle, and in some instances, could be curved. If the galaxy mirror is made as a slab of glass, as described earlier, an angled cut-off line would angle the emerging light beam in a manner similar to a prism. A curved cut-off line on a glass galaxy mirror would behave as a built-in lens to the emerging light which may prove useful in some applications.

Figure 20:
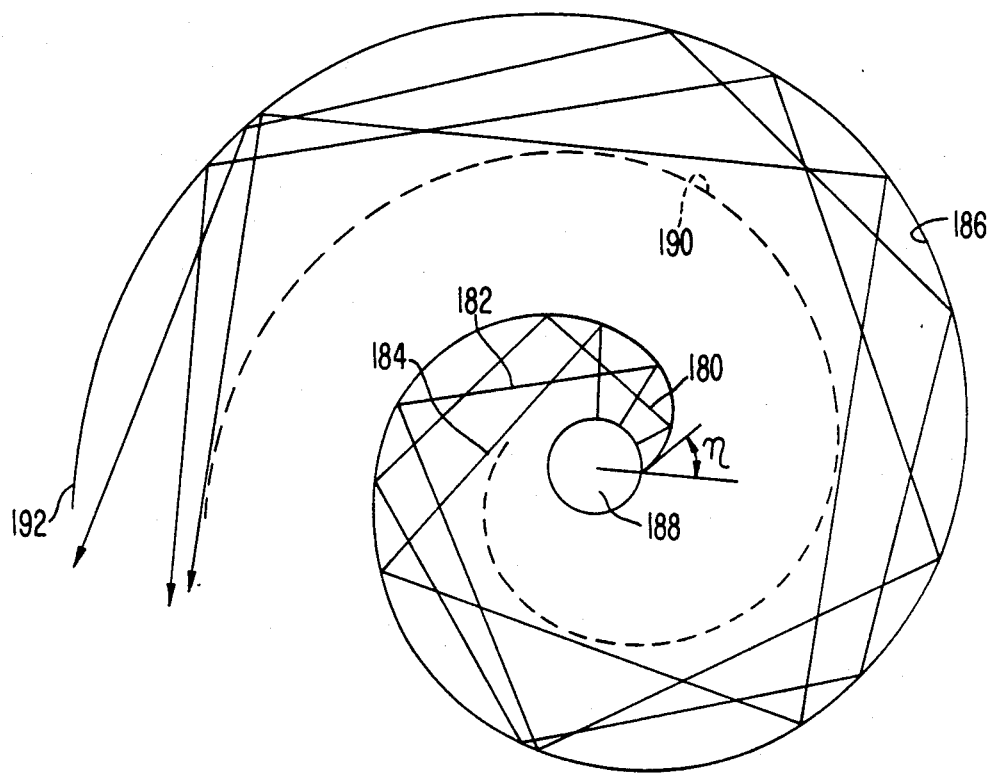
FIG. 20 is a diagrammatic representation of a single spiral mirror used in the galaxy mirror collection assembly of the present invention.

It is instructive at this point to consider in greater detail the focusing effects of a spiral mirror. An exact graphical ray trace for three light rays 180, 182 and 184 in segmented orbit around an involute of a circle spiral curve 186 is shown in FIG. 20. The involute spiral is shown for an arc angle of 540°, and is the same curve as mirror 156 in FIG. 19. The three representative light rays 180, 182 and 184, are shown emerging from the center of the hub or unit circle 188 at angles of 30°, 60°, and 90° as measured from the point where the spiral meets the unit circle. The spiral drawn as a dashed line 190 is maximum limit of the orbiting light beam which originates at the center of the hub and which has an initial angular divergence of from $\theta = 0°$ to $\theta = 90°$, including the three light rays shown.

The collimation and the beam width of the emerging light beam are the two properties of principle interest in applications of the galaxy mirror. It is usually desired that the emerging light be highly collimated and have a narrow beam width.

Considering the collimation effect first, it can be observed from FIG. 20 that the three example light rays have a total divergence between them of 60°. It is easily observed that they emerge at cut-off 192 with far less than a 60° angular spread. Exact measurements made from the drawing of the relative divergence of the three light rays is listed below in Table 2.

TABLE 2

| Orbit or Arc Angle $\theta$ | Measured Divergence of Each Light Ray | | | Total Angular Divergence of beam |
|---|---|---|---|---|
| | Ray #1 | Ray #2 | Ray #3 | |
| 0° | 30° | 60° | 90° | 60° |
| 270° | −12° | −26° | +19° | 45° |
| 360° | +13° | −21° | +8° | 34° |
| 450° | −13.5° | −10° | +5° | 18.5° |
| 540° | +20° | +3° | +7° | 17° |

The angular divergence of the three light rays is observed to progressively converge to an angular spread of 17° after orbiting 540° of the spiral.

Referring to Table 2, the total angular spread for the galaxy mirror of FIG. 19 is seen to be 45°. This is obtained by noting that the angular spread of mirror 156 would be 17°, mirror 158 is 18.5°, mirror 160 is 34°, and mirror 162 is 45° (since the mirrors have progressively shorter lengths). The total angular spread at cut-off is limited by the innermost mirror (162 in this case). The galaxy mirror of FIG. 19 would reduce the angular spread from 360° to 45° or less for a total reduction of 8 to 1.

A mathematical analysis of spiral curves in general shows that they all have the property of causing orbiting light to become increasingly collimated. However, table 2 indicates that the improvement in collimation decreases with greater angular orbit around the spiral curve. Thus, in terms of increasing the beam collimation, it would not be particularly useful to extend the spiral mirrors beyond a few 360° orbits. In FIG. 19, it would only be useful to extend the four mirrors another 180° of arc (until mirror 162 reached 450° of arc, which would give its orbiting light a 18.5° angular spread).

The orbiting light rays are not particularly sensitive to the exact mathematical form of the spiral curve. The important quantities are the radius of curvature and relative position of the curve (i.e. constantly expanding). These are quantities that can be satisfied by any smooth spiral curve. The modifications performed to the last half of mirrors 158, 160 and 162 near the cut-off line would therefore have little adverse effect on the collimation or beam width of the orbiting light.

Next consider the beam width of the light emitted at cut-off in FIG. 20. The beam width can be conveniently measured as the average maximum distance from the mirror surface to light rays travelling furtherest removed from the mirror surface as measured along a perpendicular from said mirror surface. The average maximum distance from the spiral mirror of FIG. 20 is shown as the dashed line 190. It can be noted that, in this example, the beam width quickly stabilizes after orbiting about 180°. It then very slowly increases as it moves along the spiral mirror. Also in this example, the beam width increases to 131% in orbiting from 180° to 540°. It can be speculated that by careful choice of the type of spiral curve and the limits imposed on the initial light beam, the beam width expansion can be brought down to zero or nearly zero. However, it appears unlikely that any spiral curve could be devised which would cause the beam width to converge as the orbital angle increases. Thus the narrow beam width as illustrated in FIG. 19 is an exaggeration for an unmodified galaxy mirror having only four spiral mirror arms.

The angle $\eta$ at which a spiral arm meets the hub circle, as illustrated in FIG. 19, should be noted as an important parameter of a galaxy mirror. As a convention, consider the hub angle, $\eta$, to be 0° when the spiral arm meets the hub circle at a perpendicular angle. The hub angle may thereafter vary between 0° and 45°. If the hub angle were less than 0°, light rays emerging from the hub would fail to encounter the spiral mirror altogether. If the hub angle were greater than 45°, at least some of the light encountering the spiral mirror would be reflected back into the hub.

The hub angle has a strong influence on light rays emerging from the hub region near the point where the spiral mirror meets the hub; but its influence rapidly diminishes for light rays emerging at moderate distances from this intersection point. (Nearness is within about 5° of the mirror/hub intersection point for those examples investigated to date.) The hub angle determines the initial beam width of light striking near the mirror/hub intersection point. These hub angle light rays will be given a relatively large beam width by a large hub angle (as seen in table 1 where $\eta=45°$) and will approach glazing angle of reflectance as the hub angle approaches zero. The influence of the hub angle becomes great when the number of spiral arms is increased to 24, 48, or more. For galaxy mirrors having 72 spiral arms or more, the hub angle is the dominant determinant of beam width.

In the special case where the hub angle, $\eta$, is zero, or nearly zero, light rays approaching within a few degrees of the mirror/hub intersection point reflect from the spiral mirror at near glazing angles. Previous discussion has shown that the beam width remains more or less constant throughout its multiple reflections from the spiral mirror. Near approach light rays would therefore produce an emerging light beam having a very narrow beam width which is more or less independent of the exact shape of the remaining portions of the spiral arm mirror 186. Near approach light rays begin with a small angular divergence and then become increasingly collimated after orbiting the spiral mirror. It follows that a galaxy mirror could be designed with 72 spiral mirrors or more, whereby all light approaches at near-approach angles causing a very narrow highlycollimated beam to be established. The remaining portions of the spiral arms would thereafter simply be used to direct the light in the desired direction towards some desired focus.

When the hub angle, $\eta$, approaches zero, the spiral arms are thrown outwards in wide arcs that rapidly expand away from the central hub. For large values of $\eta$, the spiral arms begin as a tight spiral around the hub. Thus a galaxy mirror having low hub angles will generally occupy greater area than a galaxy mirror having large hub angles. (This observation is only true in the vicinity of the hub. Other characteristics of the spiral curves will determine their compactness at distances removed from the hub region.) Since it is generally undesirable to have the galaxy mirror occupy a large area, a trade-off must be made between a low-initial-beam-width, large-area, low-hub-angle galaxy mirror and one which has moderate-initial-beam-width, smaller-area, and high-hub-angle.

The hub angle is an important consideration in designing a galaxy mirror but it is mathematically related to the other parameters which describe the spiral curve. Therefore, there is a choice of using the hub angle as a principle descriptor of a galaxy mirror or of ignoring it altogehter and relying instead on other descriptors which yield the same information in a different form.

The preceding discussions have shown that it is generally advantageous to design galaxy mirror assemblies having 48 spiral arm mirrors or more with small hub angles. Unlike imaging optics, the performance of a galaxy mirror assembly appears to be relatively insensitive to the exact shape of the individual spiral mirrors. This being the case, galaxy mirror assemblies having large numbers of spiral mirrors can be fabricated by automatic machines which systematically add transparent layers and metallic films to an initial shaft on an indexable lathe. The shaft would have one spiral arm jig in place at the beginning of the layering process giving it the cross-sectional appearance in FIG. 20. At some point in the layering process, the spiral arm jig would be removed. Alternatively two or more half layered elements could be formed and glued together at some later point in the fabrication process. Upon completion of the layering process, the shaft would be drilled out or otherwise removed and the sides of the hole would be polished to become the hub cavity. The cut-off output optical window would next be cut and polished along an outside edge of the layered rod. The layered rod is then sliced to the required thicknesses, and mirror coatings are applied to the top and bottom surfaces to complete fabrication of the galaxy mirror assembly.

The unmodified spiral mirrors of FIGS. 19 and 20 do not lend themselves to exact analysis. Light beams passing through the system are folded repeatedly. Various portions of a light beam undergo different numbers of reflections which depend on the exact initial position of each particular light ray element. The over-all performance of a galaxy mirror is best described by its over-all system parameters such as emerging beam width, collimation, hub, diameter, disk area, and the like. The traditional ray trace analysis as used by the optical engineer can only be meaningfully applied by a computer analysis which traces hundreds of light rays through the system to arrive at an average performance of the critical parameters. Thus computer analysis can only be performed after a design has been decided upon. Design of unmodified spiral mirror systems therefore becomes an art rather than a science.

The design of spiral mirrors in general and of the galaxy mirror assemblies in particular can be reduced to a science by the use of relay mirrors. In this method, small sections of a spiral mirror are replaced by conic mirror sections which closely approximate each particular section of the underlying spiral. However, whereas the spiral mirror has rather indeterminant optical parameters, the conic mirror sections have well understood optical properties. Using this method, the light beam can be kept well defined as it orbits in a segmented spiral path by successive reflections from a series of conic mirrors. Since the light is being passed from one discrete conic mirror to another, the mirrors have been given the name "relay mirrors".

Figure 21:
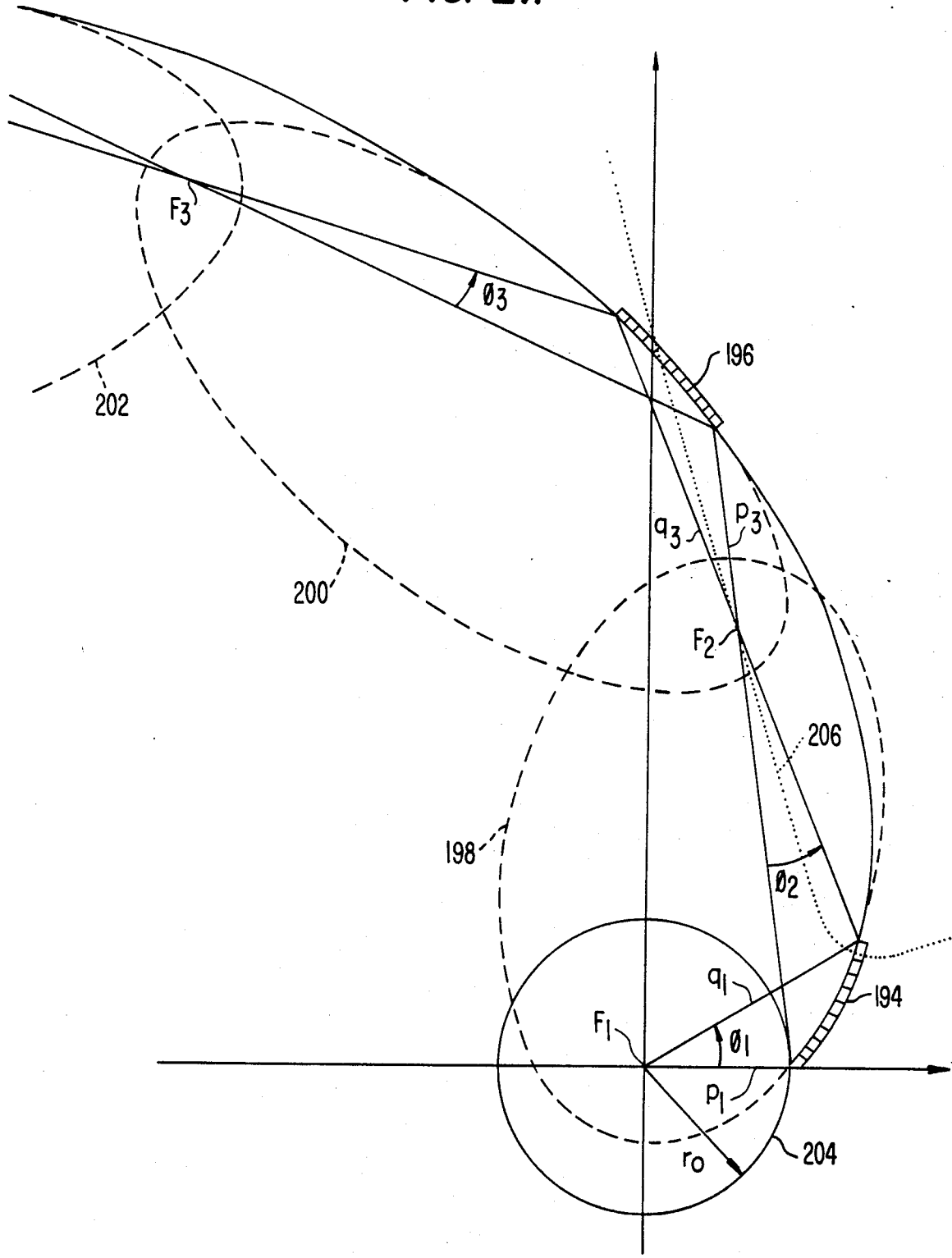
FIG. 21 is a diagrammatic representation of a spiral mirror assembly of the present invention using relay mirror segments.

Relay mirrors having an elliptical curvature have been found particularly useful in devising spiral mirror approximations. An elliptical relay mirror system along one spiral arm is shown in FIG. 21. Here two elliptical relay mirror segments 194 and 196 are shown along with the two elliptical curves 198 and 200 (shown as dashed lines) of which they are part. A portion of the third elliptical curve 202 is shown in the upper left. Light emerging from the focus $F_1$ at the center of a hub 204 strikes the first elliptical relay mirror segment 194 and is thereby brought to focus at $F_2$. Light emerging from the focus $F_2$ then strikes the second relay mirror segment 196 which in turn "relays" the light beam to a third focus $F_3$.

The first relay mirror (assumed to be a segment of an ellipse) is chosen by placing its first focus at the center of the hub at $F_1$. Next, an initial arc angle $\phi_1$, is chosen. (In this example $\phi_1 = 30°$ so that the entire galaxy mirror ensemble would have 12 spiral arms.). The intersections of the two extreme light rays of the diverging light beams with the path of the spiral form two line segments: $p_1$ and $q_1$. The condition is therefore imposed on the first elliptical curve that it must also intersect the tips of the line segments $p_1$ and $q_1$.

Mathematically, the conditions imposed on the ellipse by $F_1$, $p_1$, and $q_1$ are not sufficient to uniquely define the elliptical curve. Therefore, there exists an opportunity of imposing one additional boundary condition on the elliptical curve. In this example, the angular divergence of the secondary light beam $\phi_2$, was specified. Specifically, $\phi_2$ was chosen to be exactly half of $\phi_1$ so that in a single reflection, the beam collimation was reduced by half. At $F_3$ the beam collimation was again reduced by half so that: $\phi_2 = \frac{1}{2} \phi_1$ and $\phi_3 = \frac{1}{2} \phi_2$. The boundary conditions imposed by the two angles $\phi_1$ and $\phi_2$ and by the two line segments $p_1$ and $q_1$ uniquely define the first elliptical curve. In a similar fashion, the angles $\phi_2$ and $\phi_3$ and the line segments $p_3$ and $q_3$ are to uniquely define the second ellipse. This process is continued until all the elliptical curves are identified and defined along the spiral curve.

It becomes immediately evident to the eye that the elliptical curved mirror segments form extremely good fits to the underlying spiral curve. In this example, the elliptical and spiral curves are indistinguishable by the eye along the curved line segments of interest. One reason for this good fit is that the underlying spiral curve has a smoothly increasing radius of curvature along its entire length. The fit is made such that a portion of the ellipse, which also has an increasing radius of curvature, is superimposed over the spiral curves. Therefore, both the first and second mathematical derivatives of the two curves are well matched along the curved line segment.

The logarithmic spiral curve, $r = r_0 \epsilon^\theta$, used in this example appears to lend itself particularly well to elliptically curved approximations, but this is not the case for all spiral curves. In particular, a spiral in which the hub angle $\eta$ was zero could not be matched with any elliptical segment in the region of the hub circle. Likewise, as boundary conditions become more extreme, differences between the spiral and elliptical curves will become more noticeable. In the example of FIG. 21, the composite spiral curve with imbedded elliptically curved segments may itself be a smooth spiral curve, particularly if round-off is made at the regions where the underlying spiral and elliptical curves are joined. In other examples, where round-off is made in cases where there is poor matching between the spiral and elliptical curves, the resulting composite spiral will have flattened or bulgding regions.

In FIG. 19, an arbitrary value was chosen for $\phi_2$, namely that $\phi_2 = \frac{1}{2} \phi_1$. Clearly any arbitrary value could have been chosen for $\phi_2$, such as: $\phi_2 = k \phi_1$ where k is some constant less than one. (k values greater than one would cause the light to diverge.) However, instead of placing an arbitrary restriction on the beam divergence, it is possible instead to examine all possible solutions to the elliptical curve at a particular relay mirror This can be accomplished by plotting the locus of all possible positions of the second point of focus of the elliptical curve under consideration. This is done for the first elliptical curve of FIG. 21 and appears as a dotted line 206. Generally only those portions of the locus curve which fall within the spiral curve would be considered. Likewise, the highly curved portion of the locus which occupies the region near the relay mirror segment would not be given consideration since the k values would be greater than one in this region. The remaining portion of the locus forms a nearly straight line along which any optimum point may be chosen as the second focus.

Figure 22:
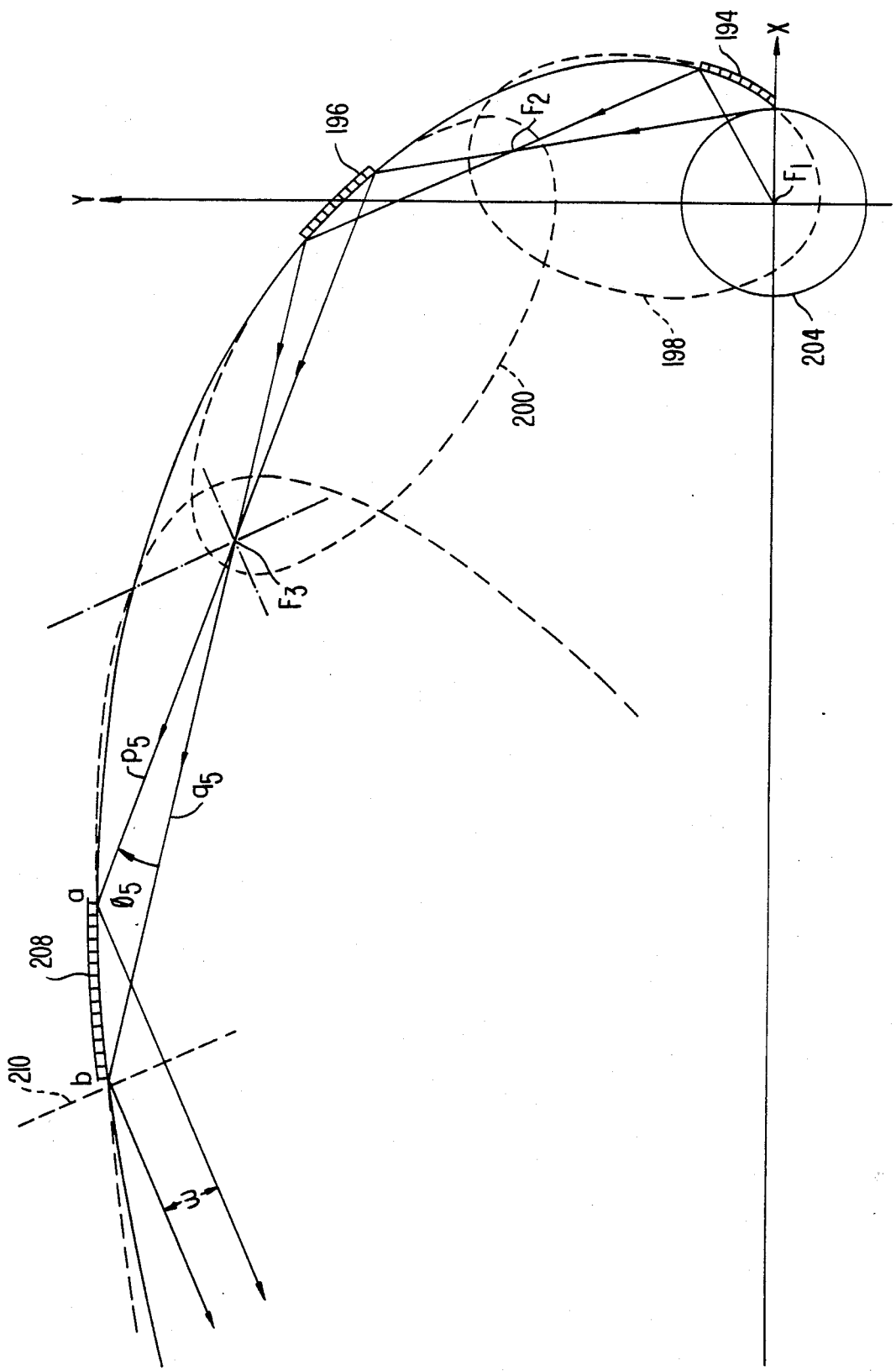
FIG. 22 is a diagrammatic representation of a spiral mirror assembly of the present invention using relay mirror segments, at least one of which is a parabolic mirror segment.

In some design situations it is useful to approximate the spiral curve with a parabolic mirror segment. In FIG. 22, as an extension of the disclosure of FIG. 21, a parabolic mirror segment 208 is positioned as the last relay mirror along a spiral arm in place of a third elliptical mirror segment. The parabola has its focus at $F_3$. Light emerging from the focus of a parabolic mirror becomes collimated after reflecting from the mirror surface (to a first approximation) as shown. If the spiral arm of a galaxy mirror assembly is terminated immediately after a parabolic mirror segment, such as along the dashed cut-off line 210, the light emerging from the galaxy mirror could be made completely collimated. However, the addition of a simple parabolic mirror segment has little influence on the beam width, w.

The general equation for the parabolic mirror segment of FIG. 21 is:

$$Y^2 = 4f(f+x)$$

where f is a constant equal to the distance between the focal point and the back center point of the parabola. Only one constant is needed to completely describe the shape of a parabolic curve and adding cross-product terms and/or other constants only serves to shift the position and angular orientation of the parabola. Specifying the initial angle, $\phi_5$, and the line segments $p_5$ and $q_5$ is sufficient to arrive at a unique value of the focal distance, f. Therefore, only one possible parabolic mirror segment can be drawn between a and b in FIG. 22 with the given initial conditions. There is no locus of possible parabolic curves. This feature limits the usefulness of parabolic curved mirror segments in this application.

Figure 23:
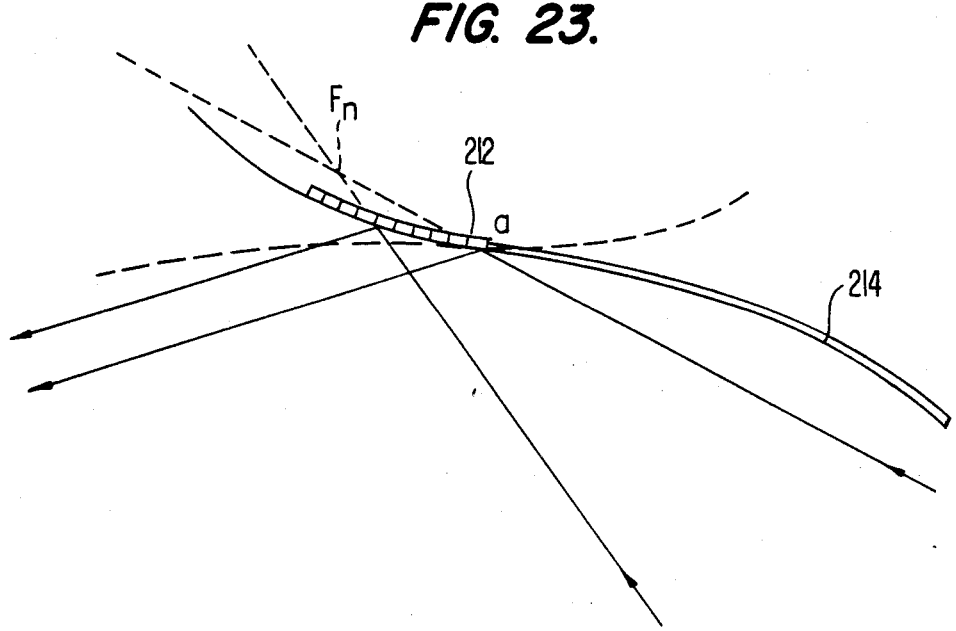
FIG. 23 is a diagrammatic representation of a spiral mirror including a convex mirror segment.

A cylindrical convex mirror segment could be used to collimate the light emerging from a spiral mirror in place of the parabolic mirror segment illustrated in FIG. 22, and a convex circular relay mirror segment of this type is shown at 212 in FIG. 23. The convex mirror is joined and arranged tangent to the end portion of the spiral mirror 214 at "a". Incoming light rays are brought to focus at $F_n$, which is located behind the convex mirror segment. Given the point of focus and orientation of the incoming light rays, the curvature of the convex mirror can be arranged to collimate the reflected light as shown. The convex mirror could have the curvature of a circle, a hyperbola, or the like, or it could be aspheric in nature. With proper adjustment of the curvature of the convex curve, a collimated light beam could be output having a narrower beam width than the parabolic curve. However, because of the difference in curvature between the spiral mirror and the convex relay mirror, the relay mirror does not approximate the underlying spiral curve. This could prove to be a problem in some spiral mirror designs such as the galaxy mirror of FIG. 19 where the spiral arms are close together at cut-off.

Figure 24:
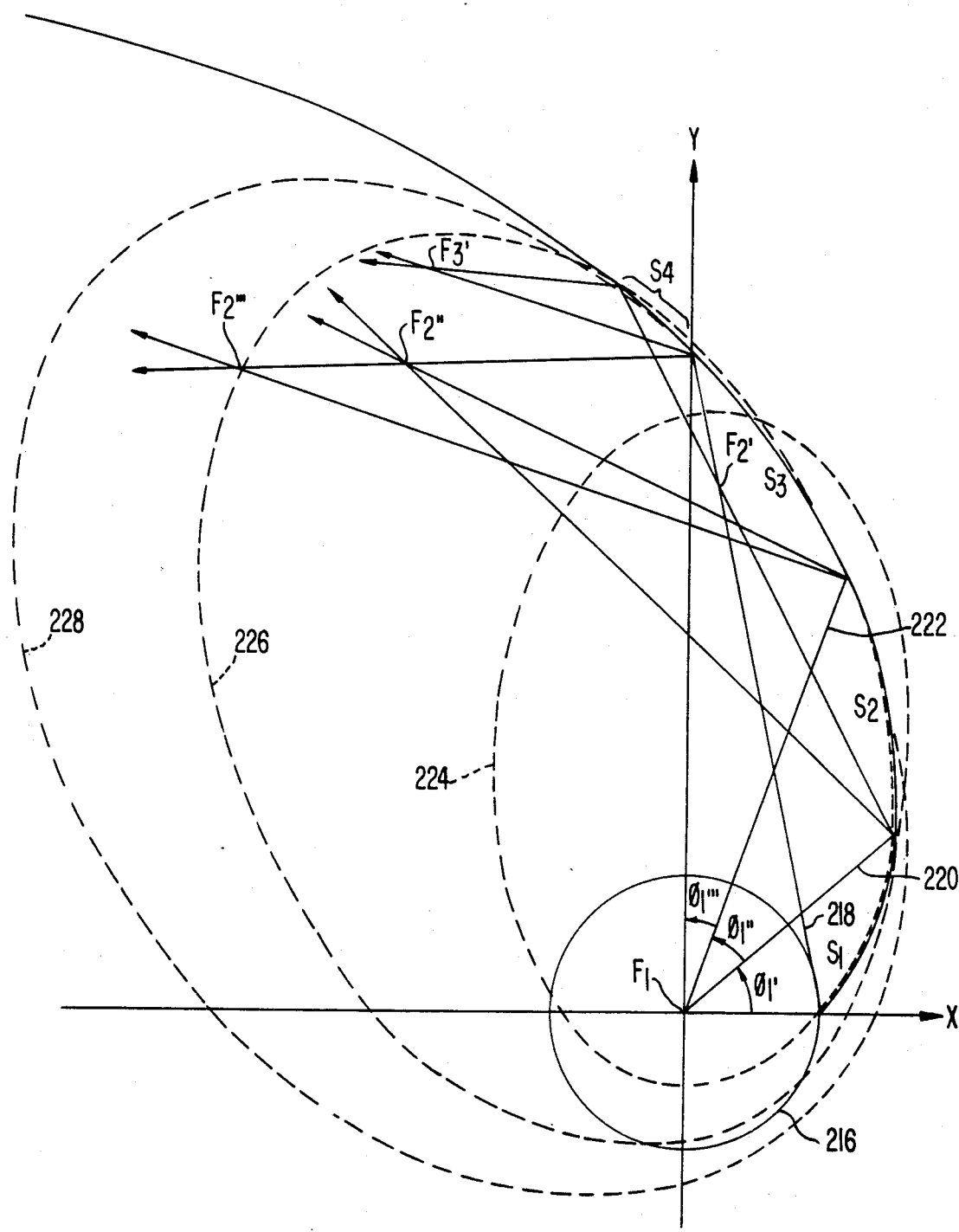
FIG. 24 is a diagrammatic representation of a spiral mirror assembly wherein a plurality of relay mirrors are arranged along a single spiral arm.

An obvious feature of the relay mirror modifications to the underlying spiral curve is that large portions of the spiral mirror remain unused by the orbiting light beams. In the examples of FIGS. 21 and 22 over three fourths of the spiral appears to be unused. One method of making better use of the spiral curve is to arrange several series of relay mirrors along the same spiral arm. One such arrangement, having three series of elliptical relay mirrors along the same spiral arm is illustrated in FIG. 24. Here light from the center of the hub 216 at $F_1$ is radiated toward the spiral arm in three separate light beams 218, 220 and 222. These light beams have initial arc angles of $\phi_1$, $\phi_1''$ and $\phi_1'''$ for a total beam spread of 90° between the positive X and Y axis. The first light beam, $218\phi_1$, strikes the spiral arm along the arc $S_1$; the second light beam $220\phi_1''$, strikes along the arc $S_2$; and the third, $222\phi_1'''$, strikes along $S_3$. The first section of arc, $S_1$, is approximated by an elliptical relay mirror section whose elliptical shape is illustrated by a first ellipse 224 having is foci at $F_1$ and $F_2'$. Likewise, the second segment, $S_2$, is approximated by an ellipse 226 having its foci at $F_1$ and $F_2''$; and the third segment, $S_3$, is approximated by an ellipse 228 having foci at $F_1$ and $F_2'''$. The three elliptical relay mirror segments; $S_1$, $S_2$, and $S_3$ form the first relay mirrors in three series $F_2'$ and $F_3'$ are therefore the foci of the $S_4$ elliptical relay mirror.

The ellipses in FIG. 24 still provide a good approximation of the underlying spiral curve. The first four elliptical mirror segments are adjacent to one another and therefore make full use of the underlying spiral along that section of arc. Unused sections of the spiral arm begin to appear after this region. Presumably it would be possible to arrange series of elliptical relay mirror segments that entirely fill the length of a spiral arm mirror. However, entirely filling a spiral arm with elliptical mirror segments would sacrifice flexibility in manipulating other system parameters.

The composite spiral and elliptical relay mirror curve is continuous but not uniform at the cusps where the elliptical mirror segments meet one another or where elliptical mirror segments meet the underlying spiral curves. If the spiral mirror and elliptical segments are cut from glass or metal by an automatic machine, it is not necessary that these regions smoothly merge with one another. However, the transmission of stray light may be facilitated by extending the length of the relay mirror segments some distance to either side of their calculated arc lengths. The extended relay mirrors could then be given rounded edges which merge smoothly with the underlying spiral curve. A mathematical/computer approach would be to first determine the extended elliptical relay mirror segments without reference to the underlying spiral curve and to use these elliptical curves as data in a regression analysis which outputs a smooth composite curve. A smooth composite curve could also be obtained by matching the slope as well as the position of the elliptical segments to the underlying spiral curve at the end points of the relay mirror segments, this last method would greatly reduce the flexibility of the relay mirror approach in determining other system parameters.

The relay mirror approach facilitates the design of a spiral mirror, or galaxy mirror, system without reference to an underlying spiral curve. The general system appearance and design parameters are first determined to arrive at a simple sketch of the desired system. Elliptical and other conic relay mirror sections are then arranged into a spiral relay mirror series having spiral distributions. Calculations can be made at this step to determine exact needed placement of the relay mirrors to produce the desired system parameters. The exact underlying spiral curve is then determined from the relay mirrors. At this point, the relay mirrors can be eliminated from consideration, and the resulting smooth underlying spiral can be used as the final mirror surface, or a composite mirror surface can be devised. In many cases, the smooth spiral curved mirror would be preferable over the composite mirror in that stray light problems would not have to be considered.

Figure 25:
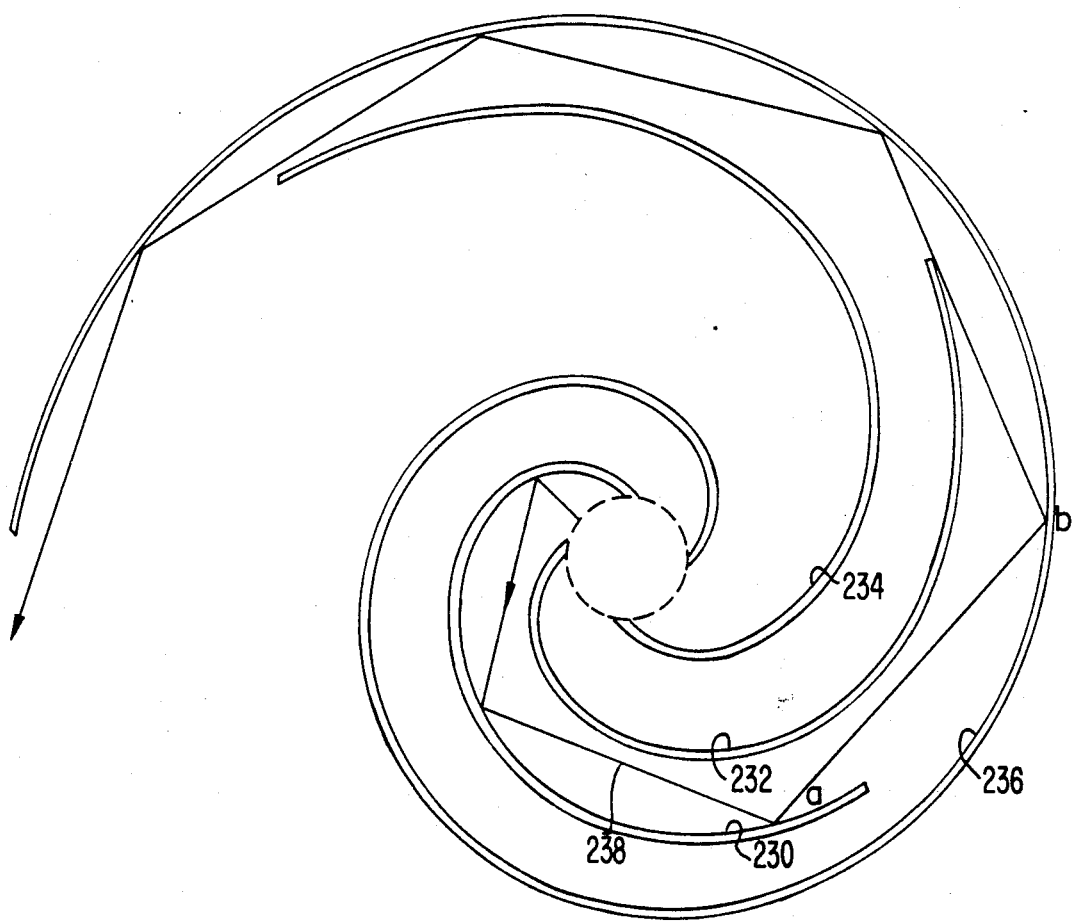
FIG. 25 is a diagrammatic representation of a spiral mirror assembly wherein a plurality of the spiral mirror arms are truncated.

It is also possible to link one spiral mirror to another so as to combine two or more orbiting light beams into one. For example, a galaxy mirror design is shown in FIG. 25 whereby three of the four spiral arms have been truncated. The truncated mirrors 230, 232, and 234 are arranged so as to link their orbiting light to mirror 236. An example light ray 238 is shown starting its orbit along mirror 230 and then changing to mirror 236 during its reflection from point a to point b. (The example light ray is not an accurate ray trace; it is shown for the purpose of illustration only).

The methods of using relay mirror approximations may be extended to linked spiral arms. For example, in FIG. 25, light orbiting mirror 230 would be brought to focus at the same point as light orbiting mirror 236. The combined light beam would be used to determine the next relay mirror along the spiral arc defined by mirror 236.

In most real applications of a galaxy mirror assembly, the input light would not originate from a perfect point source at the center of the hub, for only a laser could be arranged to approximate a true point source at the center of the hub. In the more likely applications, the light would originate from an incandescent filament, a gas discharge tube (neon, flourescent, or the like), an electric arc, or other source of electromagnetic radiation whose light producing region occupies some small volume of space. If such a light producing volume were placed at the center of the hub, then it would be seen as occupying some angular field of view, §, as seen by any point on the hub circle. (§ is zero for a point source and has the value of 180° if the light source occupies the entire volume of the hub.) Having a non-zero § angle is equivalent to reducing the number, N, of spiral mirrors around the hub. This will have the effect of increasing the beam width, or the angular divergence, or both, of the output light beam depending on the design parameters of the galaxy mirror ensemble. The unwanted effects of a non-zero § angle could be eliminated by increasing the number, N, of spiral mirror arms around the hub by some appropriate amount.

The effects of an extended light source at the focal point of the hub could be reduced by increasing the relative radius of the hub circle. However, increasing the hub radius increases the over-all size of the galaxy mirror, so that a trade-off must be made between increasing the size of the mirror assembly vs. increasing the number of spiral arms in order to obtain given output conditions as the light producing volume increases.

The control over angular divergence (from a non-point source at the center of the hub) through a galaxy mirror would be similar to other optical devices. When the angular spread of the light beam is reduced the angular divergence increases. This is generally an undesirable feature which is determined by the laws governing optical flux. The laws of optical flux place these same limiations on all other optical devices as well.

Although spiral mirrors have light flow in either direction, they are generally more useful when the light orbits in the forward direction. (Forward direction is here defined as the direction of decreasing curvature along the spiral). Light entering a galaxy mirror in the reverse direction will not generally come to a sharp focus at the center of the hub, as light travelling along any spiral mirror in the reverse direction undergoes increased divergence and its exact path is very sensitive to even very small permutations and irregularities. An exception to this rule is shown in FIG. 19 where the end portions of some of the spiral mirrors have increasing curvature.

It must be noted here that all references to specific curves made in this application, such as logarithmic spirals, involutes, ellipses, parabolas, and the like may be generalized to curves of a similar nature. Since most of the mirror surfaces disclosed would be cut by numerically controlled machinery, curves having greater complexity can be cut and polished with the same effort as simple optical surfaces. Therefore, in practice the curved surfaces of the mirrors would often be devised by a more complex mathematical analysis, or by an interactive computer analysis, or both. The spiral curves may be of any general type and may be modified by any of the techniques of this invention, including having portions in which the over-all increasing curvature is replaced by a decreasing curvature (such as at the ends of spiral arms 158, 160 and 162 in FIG. 19). The elliptical curved segments may be replaced by any curved mirror segment that serves to focus light from one focus to a second point of focus. Likewise, a parabolic curved mirror segment could be replaced by any curved mirror segment that collimates light received from a point focus. In this invention, it is the functional aspects of the curves which are of principal importance and not their specific mathematical forms.

Although the mirror assemblies of FIGS. 19–25 have been described in connection with light transmission, it should be obvious that these assemblies may be employed to reflect and transmit any form of electromagnetic radiation. For example, these assemblies may be designed so that all radiation impinges on the mirror surfaces at shallow angles of incidence (as measured between the incident ray and the mirror surface). This being the case, these mirror systems are well suited for collimating or focusing high frequency radiation such as X-rays. (X-rays will penetrate a metal surface when approaching the surface at perpendicular angles, but they will be reflected from the same surface when approaching at shallow angles of incidence). Likewise, using a quantum mechanical interpretation, nuclear particles, such as electrons, protons, and neutrons, may be considered to be high frequency waves instead of particles. Thus under carefully arranged circumstances, the mirrors of this invention could be used to focus or collimate nuclear particles. For example, the neutron particles emerging from a nuclear reactor could be collimated or focused by the mirrors of this invention. The neutrons could thereby be sent back into the reactor to increase the energy of the nuclear pile, or they could be directed out of the reaction vessel to some other useful experiment or purpose.

Normally radiation from an X-ray, neutron, or other source is housed in a lead housing or the like having a hole facing the direction to be irradiated. All radiation not initially travelling in the desired direction of the hole is absorbed by the lead shielding and is thus lost to useful purpose. Thus, by using shielding, most of the radiation is wasted. Spiral mirror systems such as the galaxy mirror assembly and the spiral mirror systems shown herein can, in many cases, be used in place of lead shielding. The spiral mirrors can gather up the radiation and direct it to where it is needed or simply beam it back to the source. In some cases, this could greatly reduce the weight of shielding (such as in a mobile nuclear reactor), and in other cases it could greatly reduce the intensity of the source radiation (such as in X-rays or neutron radiation). The X-ray telescopes which are placed in earth orbit use shallow angle parabolic mirrors of extremely high precision to control the focusing of the X-rays. The spiral reflectors of this invention can control the beaming of X-rays without the need for such high precision, since imaging and precise points of focus are not required.

Figure 26:
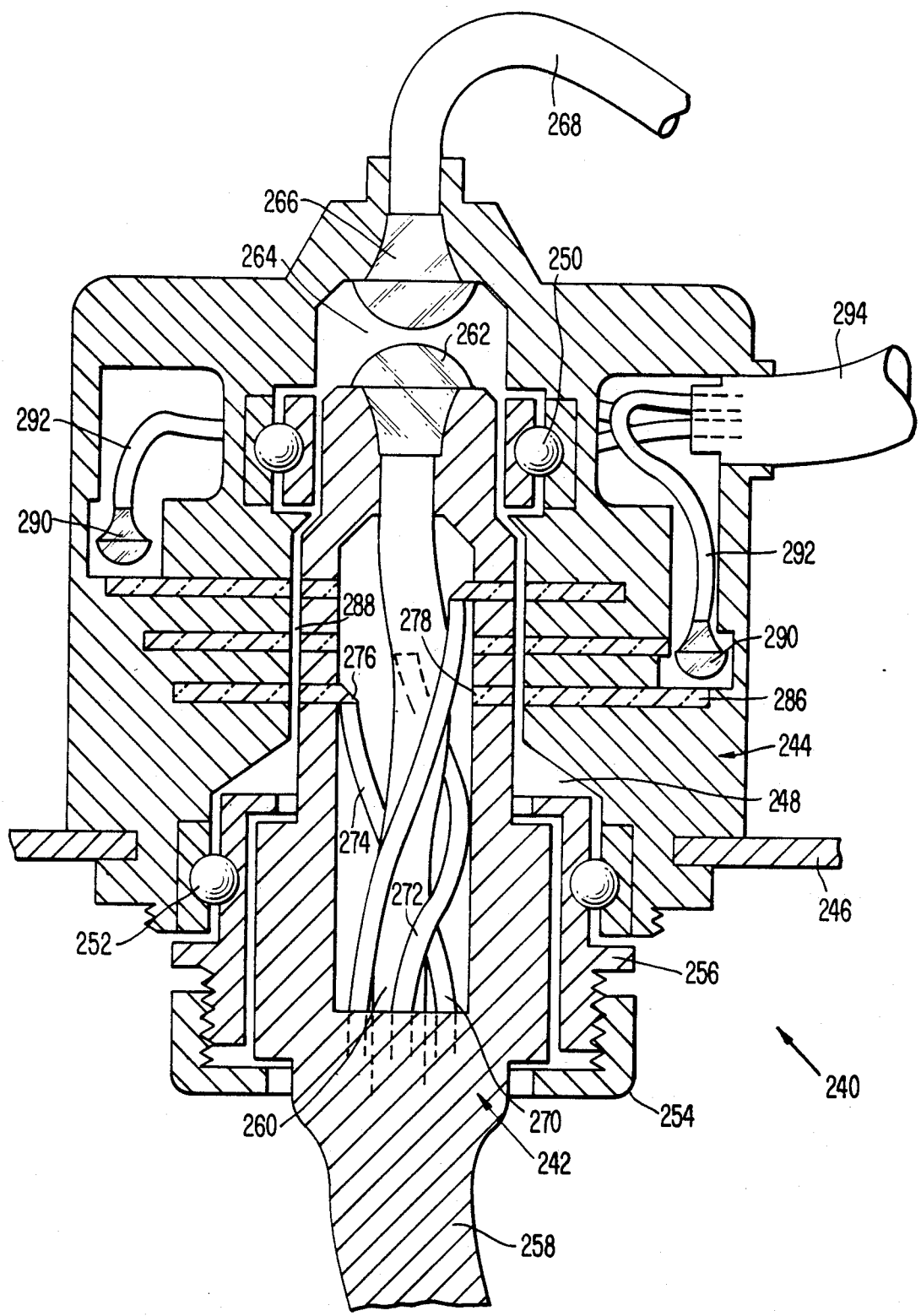
FIG. 26 is a sectional view of the rotatable optical connector of the present invention.

The galaxy or spiral mirror technology and the light distribution rod technology heretofore described can be combined in a simple and effective rotatable optical connector assembly. This assembly, indicated generally at 240 in FIG. 26, includes a central rotor assembly 242 which is surrounded by a stationary stator assembly 244. The stator assembly is normally secured to a stationary support 246.

The stator assembly includes a central chamber 248 which is dimensioned to receive the rotor assembly 242. The rotor assembly is mounted for rotation within this central chamber by an upper bearing assembly 250 and a lower bearing assembly 252. These bearing assemblies grip the rotor while permitting rotation. A threaded cap 254 is secured onto a threaded sleeve 256 which constitutes a portion of the lower bearing assembly to hold the rotor assembly within the stator assembly.

The rotor assembly is connected to a large optical fiber cable 258 which is free to rotate with the rotor assembly. This cable may be connected to any object which rotates relative to the stationary support 246, and carries a large, many stranded optical fiber lightpipe cable 260 which extends through the center of the rotor assembly and is connected to a lens 262 centrally mounted on the rotor assembly. In this embodiment, this multi-strand lightpipe cable 260 consists of coherently arranged optical fibers which allow an image to be carried by the cable. The light image is sent into the lens 262, which is a collimating lens which beams the image across an upper gap 264 to an identical collimating lens 266 mounted in aligned, opposed relationship on the stator assembly. The collimating lens 266 sends the light image into a second coherent multi-strand optical fiber cable 268 located at the top of the stator assembly. In this arrangement, the image will rotate as the rotor assembly rotates, as viewed at the end of the optical fiber cable 268. Some image intensity and some image detail will be lost in this face-to-face lens arrangement, but the losses are acceptable and this arrangement allows light images to be sent in either direction. Unfortunately only one lightpipe cable and lens 262 may be positioned at the top center of the rotor assembly when the rotor assembly must remain free to rotate.

The large lightpipe cable 260 could be used for other purposes than image transmission. It could carry two-way communication signals; although for this use the cable would not need to be so large. It could also be used to carry a high intensity light beam, which could provide a non-electrical source of power to energize components located at the far end of the cable 258. For example, a data gathering device could be located at the end of the cable 258, and the large cable 260 could provide light power from the cable 258 to this device. All elements of the data gathering device could be designed to operate on optical power instead of electric power, and to send resulting optical data signals by way of the three returning optical fiber data lines. In this way the data gathering device would be impervious to electromagnetic-pulse (EMP) interference from nuclear weapons and the like.

The problem of sending communication signals through a rotating connector along more than one optical fiber line is solved by the connector assembly 240 which uses ring-like optical components which face one another along the rotor assembly. These optical slip-rings on the rotor assembly are surrounded by galaxy mirror assemblies extending along the walls of the central chamber 248 in the stator assembly.

Figure 28:
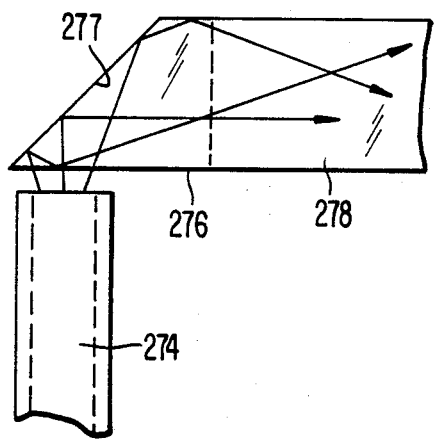
FIG. 28 is a diagrammatic view of a portion of the optical slip ring assembly of FIG. 26.

Optical communication signals from the optical fiber cable 258 are transmitted into the rotor assembly 244 by three optical fibers 270, 272, 274. These optical fibers pass through the central portion of the rotor assembly, and each is then affixed directly to its own optical slip ring. The attachment is made directly to a protrusion 276 which is provided for this purpose by each of the optical slip rings 278, and is made by means of an optical adhesive and/or mechanical means. The protrusion 276 contains a 45° mirror/prism 277 which bends the light beam emerging from the optical fiber into the plane of the slip ring (FIG. 28).

Figure 27:
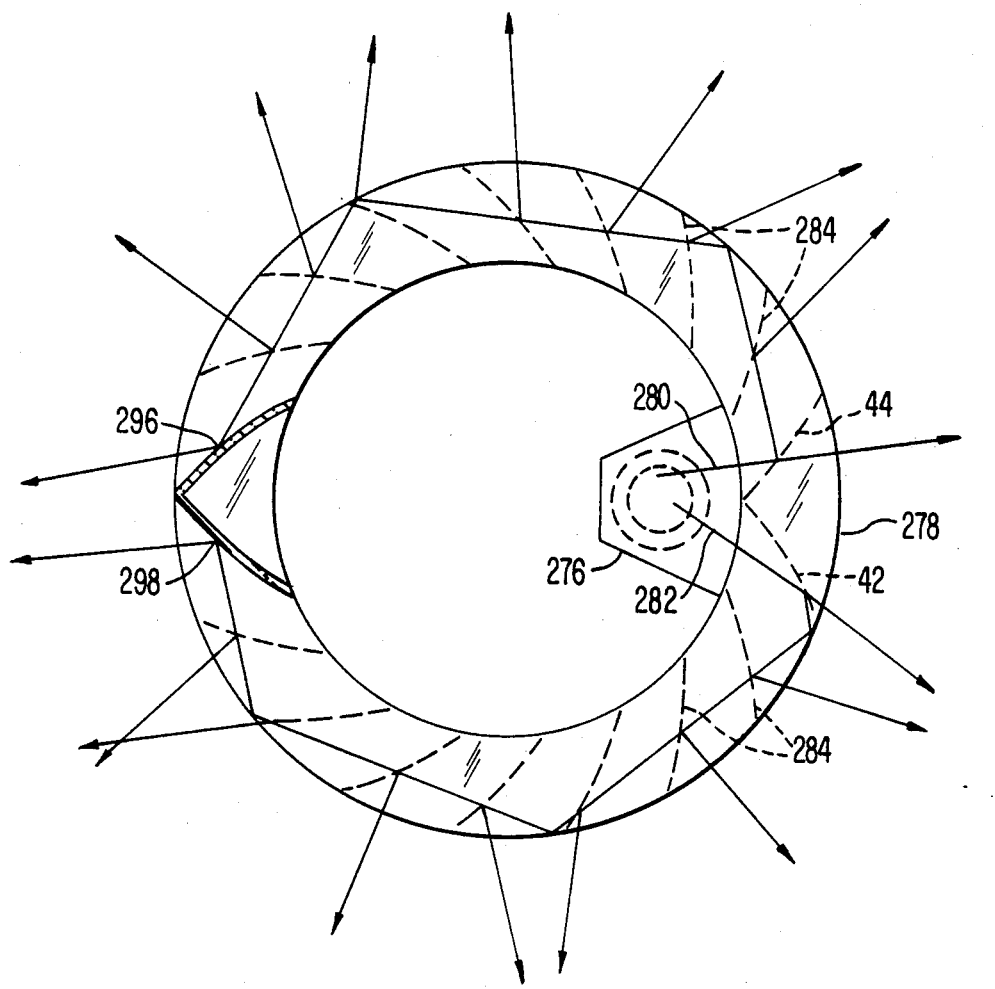
FIG. 27 is a diagrammatic plan view of an optical slip ring assembly used in the rotatable optical connector of FIG. 26.

Each optical slip ring is a circular light diffusion rod as illustrated previously in FIG. 11 and is shown in greater detail in FIG. 27. Light entering the slip ring from the input protrusion 276 first strikes a "V" shaped curved beam splitting mirror of the type illustrated at 42 and 44 of FIG. 3. This "V" mirror divides the input light into two beams 280 and 282 which "orbit" the slip ring 278 in clock-wise and counter clock-wise directions. The "V" shaped beam splitting mirror also allows a small percentage of the light to pass straight through and out the slip-ring periphery. Light within the slip-ring proceeds to "orbit" by reflection around the outside rim by the process of total internal reflection. Strategically placed logarithmic spiral beam-splitting mirrors 284 within the slip-ring reflect the orbiting light out of the slip-ring and directly into an opposed pick-up "galaxy mirror" assembly 286 on the stator assembly. By careful choice of the reflectivity of each beam splitting mirror, as discussed at the beginning of this application, the orbiting light can be uniformly distributed around the periphery of the light distribution rod slip-rings 278.

Returning to FIG. 26, it can be noted that light emerging from the optical slip-rings 278 located along the rotor assembly crosses a very narrow gap 288 to their optical counterparts located on the stator assembly portion of the connector. These optical counterparts are galaxy mirror assemblies 286 whose basic configuration is shown in FIG. 19. However, all the possible modifications discussed in this application may be applied to this optical element. The hub of these galaxy mirrors extend around the chamber 264 to receive light from the slip-rings. The result is a glass disk having embedded mirrors which collects at its hub region the light emitted by the slip-ring 278 and directs it to a point along its periphery. A 45° mirror means is placed at this periperhy point, as part of the galaxy mirror disk, and is used to beam the collected light upwards in a well-collimated light beam. The collimated light beam then enters a small collimating lens 290 which focuses the light into another single strand optical fiber 292. The optical fiber is threaded through torus-shaped cavities in the stator assembly to the attachment point of a three strand optical fiber cable 294.

The optical slip-ring 278 is an optical diodelike device as previously described, which only allows light to flow in one direction. Light may therefore only travel from the rotor assembly to the stator assembly in this arrangement. However, a mix of both forward and reverse slip ring/galaxy mirror pairs could be arranged within the same rotatable connector to provide optical paths in either or both directions.

The optical slip ring 278 (FIG. 27) includes a pair of completely reflecting mirrors 296 and 298 in a curved "V" arrangement placed on the side opposite to the input protrusion 276. All light reaching these mirrors is beamed out of the slip ring. This is an important feature when communication signals are sent along the slip ring, for these mirrors prevent a signal from circulating around the ring more than once, thereby preventing a decrease in the bandwidth of the output signal.

It can be noted in FIG. 27 that the light does not emerge exactly along radial lines from the periphery of the slip ring 278. This is true even for the counter clockwise orbiting light ray 280 which originates from a direction that appears to originate from the exact center of the slip ring cavity. The problem is that the light ray "orbits" as straight line segments instead of as a circle. This causes the optical slip ring to give its output light an added angular divergence in addition to the one it already has while travelling within the optical fiber. However, as discussed previously, the galaxy assembly 286 could be designed to take this angular divergence into account and reduce it.

The spaces between the rotor and stator assemblies of the connector 240 may be filled with an optical jell/lubricant to prevent the intrusion of dirty water or other contaminants between the optical elements and to equalize hydraulic pressure within the connector.

Industrial Applicability

The light distribution assemblies of the present invention may be used effectively to evenly distribute light from a parallel beam over an extended area. These distribution assemblies may be effectively employed in lighting fixtures or for other applications where controlled light distribution is required.

The spiral mirror light collection assemblies of this invention are employed to take light which is distributed and to collimate this light into a substantially parallel beam. Thus these light collection assemblies may take light from an electric bulb or fluorescent tube and collimate this light into a beam which may be transmitted through a light transmission cable.

The light distribution and collection assemblies of this invention may be combined in a rotatable optical coupler which effectively transmits light between two relatively rotating units.

I claim:

1. In a light distribution assembly for distributing light from a beam of light provided by a light source of the type comprising a light transmitting means for receiving light from said light source and transmitting said light along at least one path within said light transmitting means, and mirror means including a plurality of spaced, beam splitting mirror means positioned to intercept light travelling along said path, a group of said beam splitting mirror means each operating to deflect a portion of said light outwardly from said light transmitting means while permitting the remainder of said light to continue along said path the improvement for enabling said group of beam splitting mirror means operate to deflect light of substantially equal intensity outwardly from said light transmitting means wherein each beam splitting mirror means in said group of beam splitting mirror means is formed to provide a reflectivity which differs from that of the remaining beam splitting mirror means, the reflectivity of each said beam splitting mirror means progressively increasing as the distance of said mirror means from the light source increases and wherein said light transmitting means is a rod into which said mirror means are incorporated at equally spaced intervals in a manner such that said group of beam splitting mirrors collectively fill a length of said rod without adjacent mirror means overlapping, said rod having a length that corresponds to the width thereof multiplied by the number of said beam splitting mirror means.

2. The light distribution assembly of claim 1, wherein said rod is a curved light transmitting rod.

3. The light distribution assembly of claim 1, wherein said rod is a circular light transmitting rod, and said group of beam splitting mirror means are spaced cone-shaped mirrors imbedded in said circular light transmitting rod, each such cone-shaped mirror having an apex arranged to point toward said light source.

4. The light distrubution assembly of claim 3, wherein the apex angle for each such apex is 90° and each such apex is positioned to lie along the central longitudinal axis of said circular light transmitting rod.

5. The light distribution assembly of claim 1, wherein said light transmitting rod is flexible.

6. The light distribution assembly of claim 1 wherein said light transmitting means is operable to transmit said light along a pair of oppositely directed paths.

7. A light distribution assembly comprising a lighting fixture support means, light emitting means mounted upon said fixture support means, said light emitting means including light transmitting means for receiving solar light and transmitting said light along at least one path within said light transmitting means and mirror means including a plurality of spaced beam splitting mirror means positioned to intercept light travelling along said path, a group of said beam splitting mirror means each operating to deflect a portion of said light outwardly from said light transmitting means while permitting the remainder of said light to continue along said path, and artificial light source means mounted upon said fixture support means to provide light independent of solar light emitted by said light transmitting means.

8. The light distribution assembly according to claim 7, wherein said artificial light source is positioned relative to said light transmitting means for providing light separately from that emitted from said light transmitting means and by reflection from said light transmitting means.

9. The light distribution assembly of claim 7 wherein said light emitting means includes at least one electric light assembly mounted upon said fixture support means to provide light through said light transmitting means.

10. A method for collimating light from a light source which includes causing said light to follow at least one substantially spiral path from said source to an output, placing reflecting means along said sprial path to cause multiple reflections of said light passing along said path, and preventing the angular divergence of said light from increasing as it passes along said path to the output.

11. The method according to claim 10, wherein said method is performed with said light source being directed into a hub of spirally configured mirror array and emitted in a substantially collimated form at a circumferential extremity of the array.

12. A light collecting assembly for collimating light from an extended light source into a beam comprising a hub means for providing said light and spirally curved light path defining means positioned to receive light from said hub and cause said light to be confined within a spirally curved path extending outwardly away from and around said hub, said curved light path defining means including mirror means mounted along said curved path to cause multiple reflections of said light along said curved path, said mirror means operating to cause collimation of said light as it moves along said curved path.

13. The light collecting assembly of claim 12, wherein said spirally curved light path defining means includes a plurality of mirror units arranged to provide a plurality of non-overlapping substantially spiral light paths extending from points around said hub to an output spaced outwardly of said hub.

14. The light collecting assembly of claim 13, wherein each of said light paths is defined by a single mirror extending spirally from said hub to said output.

15. The light collecting assembly of claim 13 wherein each of said light paths is defined by a plurality of spaced mirrors positioned in spaced relationship along said light path.

16. A rotatable optical connector comprising a rotor, a stator having a rotor receiving cavity, means for mounting said rotor for rotation within said rotor receiving cavity, optical light distribution means extending around the periphery of said rotor, said optical light distribution means operating to receive a light beam and to distribute the light from said beam outwardly from said rotor around the periphery thereof, light transmission means connected to provide a light beam to said optical light distribution means, and optical light collecting means mounted on said stator for receiving the light distributed outwardly from said rotor and operating to collimate said light into a beam, said optical light collecting means having a light receiving means which extends around said rotor receiving chamber in spaced opposed relationship to said light distribution means, wherein said optical light collecting means includes hub means forming said light receiving means and spirally curved light defining means positioned to receive light from said hub means and cause said light to be confined within a spirally curved path extending outwardly away from and around said hub means, said spirally curved light path defining means including mirror means mounted along said spirally curved path to cause multiple reflections of said light along said spirally curved path, said mirror means operating to cause collimation of said light as it moves along said spirally curved path.

17. The rotatable optical connector of claim 16, which includes a first light output and receiving means mounted upon said rotor in alignment with the central rotational axis thereof, said light transmission means being connected to said first light output and receiving means, and a second light output and receiving means mounted upon said stator in spaced optical alignment with said first light output and receiving means.

18. The rotatable optical connector of claim 16, wherein said optical light distribution means includes light rod means extending around said rotor for receiving and transmitting light along at least one path within said light rod means, and mirror means including a plurality of spaced, beam splitting mirror means positioned to intercept light travelling along said path, a group of said beam splitting mirror means each operating to deflect a portion of said light outwardly from said light rod means while permitting the remainder of said light to continue along said path.

19. The rotatable optical connector according to claim 16, wherein said spirally curved light path defining means includes a plurality of mirror units arranged to provide a plurality of non-overlapping substantially spiral light paths extending from points around said hub to an output spaced outwardly of said hub.

20. The rotatable optical connector according to claim 19, wherein each of said light paths is defined by a plurality of spaced mirrors positioned in spaced relationship along said light path.

21. The rotatable optical connector according to claim 19, wherein each of said light paths is defined by a plurality of spaced mirrors positioned in spaced relationship along said light path.

* * * * *